United States Patent
Nagasawa

(10) Patent No.: US 12,108,008 B2
(45) Date of Patent: Oct. 1, 2024

(54) INFORMATION PROCESSING APPARATUS, NON-TRANSITORY COMPUTER READABLE MEDIUM, AND INFORMATION PROCESSING METHOD FOR TRANSFERING POST-PROCESSING INFORMATION

(71) Applicant: FUJIFILM Business Innovation Corp., Tokyo (JP)

(72) Inventor: Kanae Nagasawa, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 189 days.

(21) Appl. No.: 17/711,356

(22) Filed: Apr. 1, 2022

(65) Prior Publication Data
US 2023/0099763 A1    Mar. 30, 2023

(30) Foreign Application Priority Data
Sep. 24, 2021   (JP) ................. 2021-155543

(51) Int. Cl.
*H04N 1/32*     (2006.01)
*H04N 1/00*     (2006.01)

(52) U.S. Cl.
CPC ..... *H04N 1/32363* (2013.01); *H04N 1/00856* (2013.01); *H04N 1/32106* (2013.01); *H04N 1/32523* (2013.01); *H04N 2201/3219* (2013.01); *H04N 2201/3226* (2013.01); *H04N 2201/3242* (2013.01); *H04N 2201/3295* (2013.01)

(58) Field of Classification Search
CPC .......... H04N 1/32363; H04N 1/00856; H04N 1/32106; H04N 1/32523; H04N 2201/3219; H04N 2201/3226; H04N 2201/3242; H04N 2201/3295
See application file for complete search history.

(56) References Cited

U.S. PATENT DOCUMENTS

| | | | | |
|---|---|---|---|---|
| 2004/0215759 A1* | 10/2004 | Takahashi | .......... | H04N 1/00233 709/223 |
| 2007/0297002 A1* | 12/2007 | Hase | ..................... | G06F 21/608 358/1.15 |
| 2010/0293550 A1* | 11/2010 | Gnanasambandam | ..................... | H04N 1/00923 718/104 |
| 2012/0268785 A1* | 10/2012 | Okada | .................... | H04N 1/346 358/1.15 |
| 2016/0226952 A1* | 8/2016 | Hong | ..................... | H04L 67/01 |

(Continued)

FOREIGN PATENT DOCUMENTS

| | | |
|---|---|---|
| JP | 2012-256133 A | 12/2012 |
| JP | 2014-102791 A | 6/2014 |
| WO | 2012/169396 A1 | 12/2012 |

*Primary Examiner* — Nicholas Pachol
(74) *Attorney, Agent, or Firm* — Oliff PLC

(57) ABSTRACT

An information processing apparatus includes a processor configured to: transmit pre-process information to a processing apparatus that generates post-process information as a result of processing the pre-process information; and transmit identification information, used to acquire the post-process information, to an apparatus belonging to an apparatus group, satisfying a predetermined condition, among multiple apparatus groups of apparatuses that are enabled to acquire the post-process information and transfer the acquired post-process information to another apparatus.

13 Claims, 13 Drawing Sheets

(56) References Cited

U.S. PATENT DOCUMENTS

| | | | | |
|---|---|---|---|---|
| 2017/0195506 A1* | 7/2017 | Kato | ............... | H04N 1/32523 |
| 2018/0239563 A1* | 8/2018 | Okuda | ............... | H04N 1/00244 |
| 2019/0312956 A1* | 10/2019 | Nishi | ............... | H04N 1/00 |
| 2021/0208826 A1* | 7/2021 | Tabuchi | ............... | G06F 3/1236 |
| 2022/0210287 A1* | 6/2022 | Tsuji | ............... | H04N 1/00962 |
| 2022/0210288 A1* | 6/2022 | Tsuji | ............... | G06F 9/4825 |

\* cited by examiner

INFORMATION PROCESSING APPARATUS, NON-TRANSITORY COMPUTER READABLE MEDIUM, AND INFORMATION PROCESSING METHOD FOR TRANSFERING POST-PROCESSING INFORMATION

CROSS-REFERENCE TO RELATED APPLICATIONS

This application is based on and claims priority under 35 USC 119 from Japanese Patent Application No. 2021-155543 filed Sep. 24, 2021.

BACKGROUND

(i) Technical Field

The present disclosure relates to an information processing apparatus, a non-transitory computer readable medium, and an information processing method.

(ii) Related Art

Japanese Unexamined Patent Application Publication No. 2014-102791 discloses a process that, when a data file is stored on a cloud, determines additional information to be deleted from the data file in accordance with an attribute of a storage destination, generates a search key unique to the data file, and attaches the search key to the data file to store the data file.

When post-process information from a processing apparatus is provided to an apparatus that is to transfer the post-process information to another apparatus, information providing may be performed based on condition that pieces of identification information match with each other. If the identification information is uniformly provided to all apparatuses that are enabled to access the processing apparatus, the processing apparatus may be accessed from all the apparatuses, possibly causing information leakage.

SUMMARY

Aspects of non-limiting embodiments of the present disclosure relate to providing identification information to a specific apparatus from among apparatuses that are enabled to transfer post-process information from a processing apparatus to another apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: transmit pre-process information to a processing apparatus that generates post-process information as a result of processing the pre-process information; and transmit identification information, used to acquire the post-process information, to an apparatus belonging to an apparatus group, satisfying a predetermined condition, among multiple apparatus groups of the apparatuses that are enabled to acquire the post-process information and transfer the acquired post-process information to another apparatus.

BRIEF DESCRIPTION OF THE DRAWINGS

Exemplary embodiment of the present disclosure will be described in detail based on the following figures, wherein.

DETAILED DESCRIPTION

Figure 1:
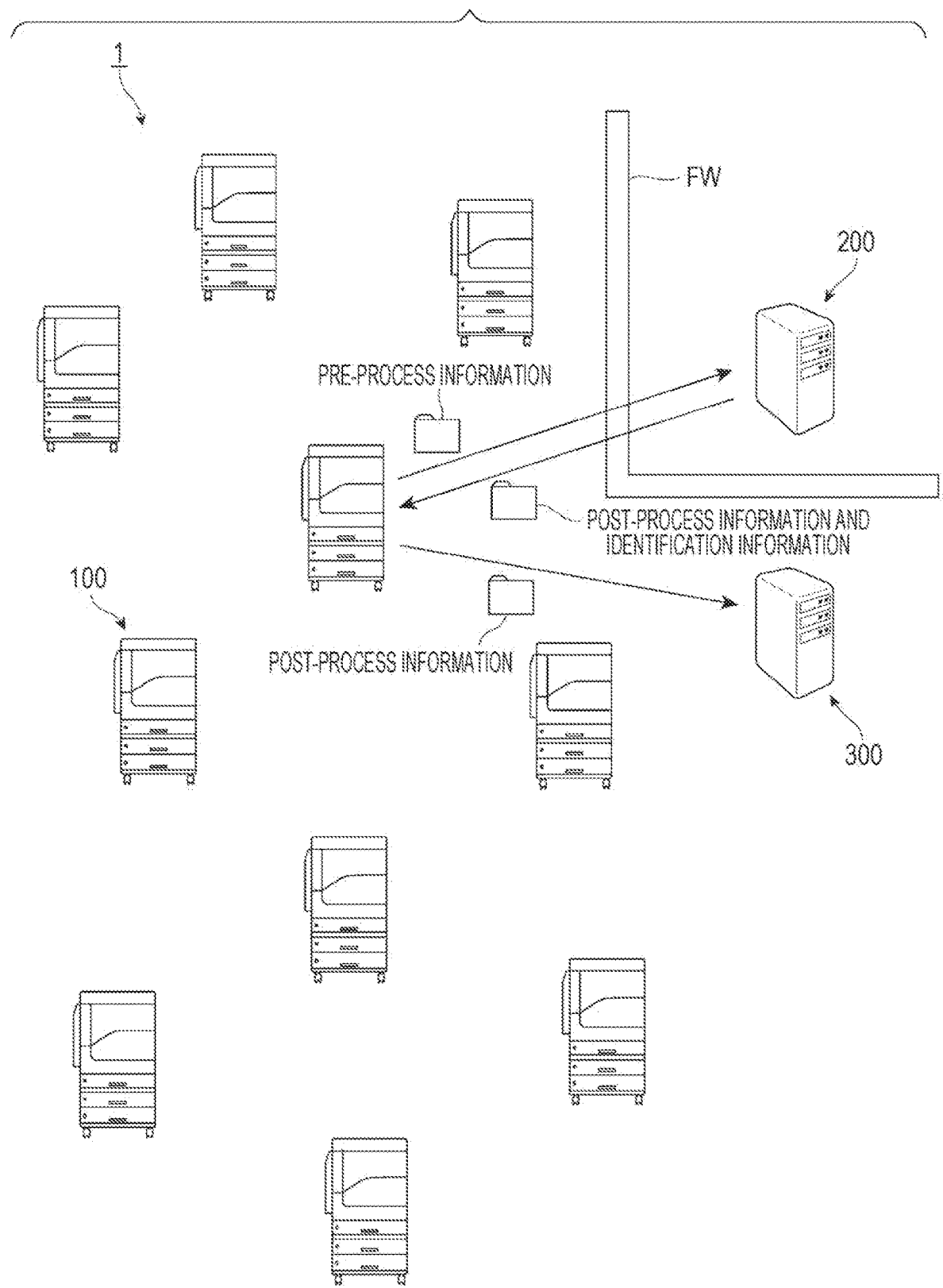
FIG. 1 illustrates a configuration of an information processing system of the exemplary embodiment.

Exemplary embodiment of the disclosure is described below with reference to the drawings. FIG. 1 illustrates a configuration of an information processing system 1 of the exemplary embodiment. The information processing system 1 of the exemplary embodiment includes multiple terminal apparatuses 100 and a processing apparatus 200 that processes information transmitted from one or more of the terminal apparatuses 100. For example, the processing apparatus 200 is present on a cloud. The terminal apparatuses 100 are installed at a specific organization, such as a company, and connected to each other via a communication network (not illustrated). The communication network may be a wired or wireless communication network.

According to the exemplary embodiment, a fire wall (FW) is installed, the terminal apparatuses 100 are installed inside the FW, and the processing apparatus 200 is installed outside the FW. The processing apparatus 200 processes pre-process information from the terminal apparatus 100 and generates post-process information as a result of processing the pre-process information. According to the exemplary embodiment, the terminal apparatus 100 serving as an example of an information processing apparatus transmits the pre-process information to the processing apparatus 200. The processing apparatus 200 processes the pre-process information to generate the post-process information.

The exemplary embodiment includes a receiving apparatus 300 that receives the post-process information generated by the processing apparatus 200. The receiving apparatus 300 serving as an example of a specific apparatus is installed inside the FW. The receiving apparatus 300 is connected to the terminal apparatuses 100 via a communication network (not illustrated). The communication network may be a wired network or a wireless network.

According to the exemplary embodiment, the post-process information generated by the processing apparatus 200 is transmitted to the receiving apparatus 300 via one of the terminal apparatuses 100. In other words, the post-process information is transmitted to the receiving apparatus 300 via one of the terminal apparatuses 100. The post-process information is stored on the receiving apparatus 300.

Figure 2:
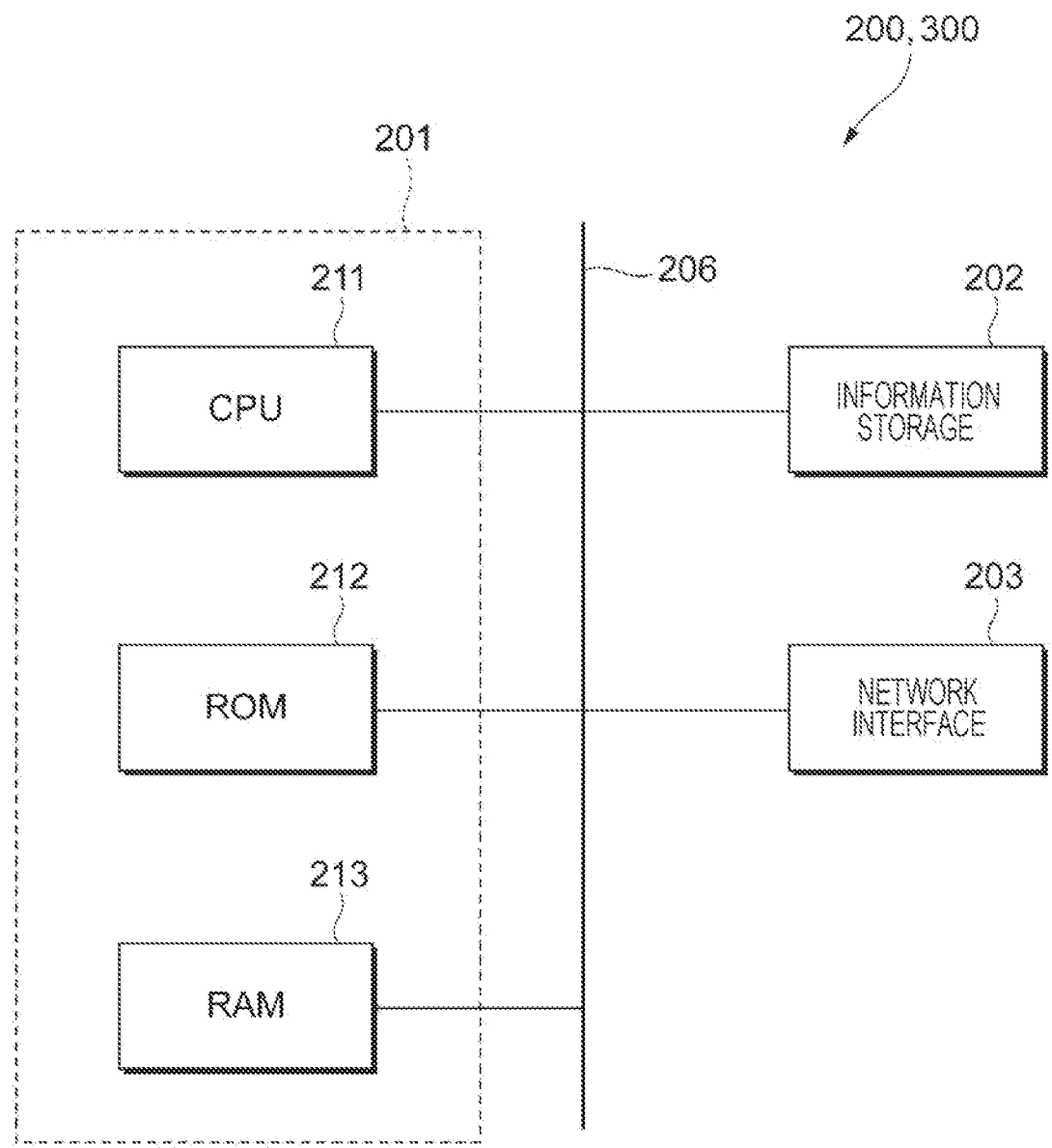
FIG. 2 illustrates a hardware configuration example of a processing apparatus and receiving apparatus.

FIG. 2 illustrates a hardware configuration example of each of the processing apparatus 200 and receiving apparatus 300. Each of the processing apparatus 200 and receiving apparatus 300 includes an information processor 201, information storage 202 storing information, and network interface 203 performing communications via a local-area network (LAN) cable.

The information processor 201 is a computer. The information processor 201 includes a central processing unit (CPU) 211 serving as a processor performing a variety of processes described below. The information processor 201 also includes a read-only memory (ROM) 212 storing software and a random-access memory (RAM) 213 used as a work area. The information storage 202 may be implemented by an available information storage, such as a hard disk drive, semiconductor memory, or a magnetic tape. The information processor 201, information storage 202, and network interface 203 are connected to each other via a bus 206 and a signal line (not illustrated).

A program to be executed by the CPU 211 may be delivered in a recorded state on a computer readable recording medium to the processing apparatus 200 and receiving apparatus 300. The computer readable recording medium may be a magnetic recording medium (such as a magnetic tape or a magnetic disk), optical recording medium (optical disk), magnetooptical recording medium, or a semiconductor memory. The program to be executed by the CPU 211 may be delivered to the processing apparatus 200 and receiving apparatus 300 via a communication medium, such as the Internet.

Each of the terminal apparatuses 100 (see FIG. 1) as an example of an information processing apparatus has an image forming function that forms an image on a recording medium, such as a paper sheet. Each of the terminal apparatuses 100 may be construed as an image forming apparatus. Each of the terminal apparatuses 100, including an image reading device, has an image reading function to read an image of an original document besides the image forming function. Each of the terminal apparatuses 100 has a transmission and reception function to transmit and/or receive a variety of information, such as image data. Each of the terminal apparatuses 100 has a fax function. The fax function may be implemented by the transmission and reception function.

Figure 3:
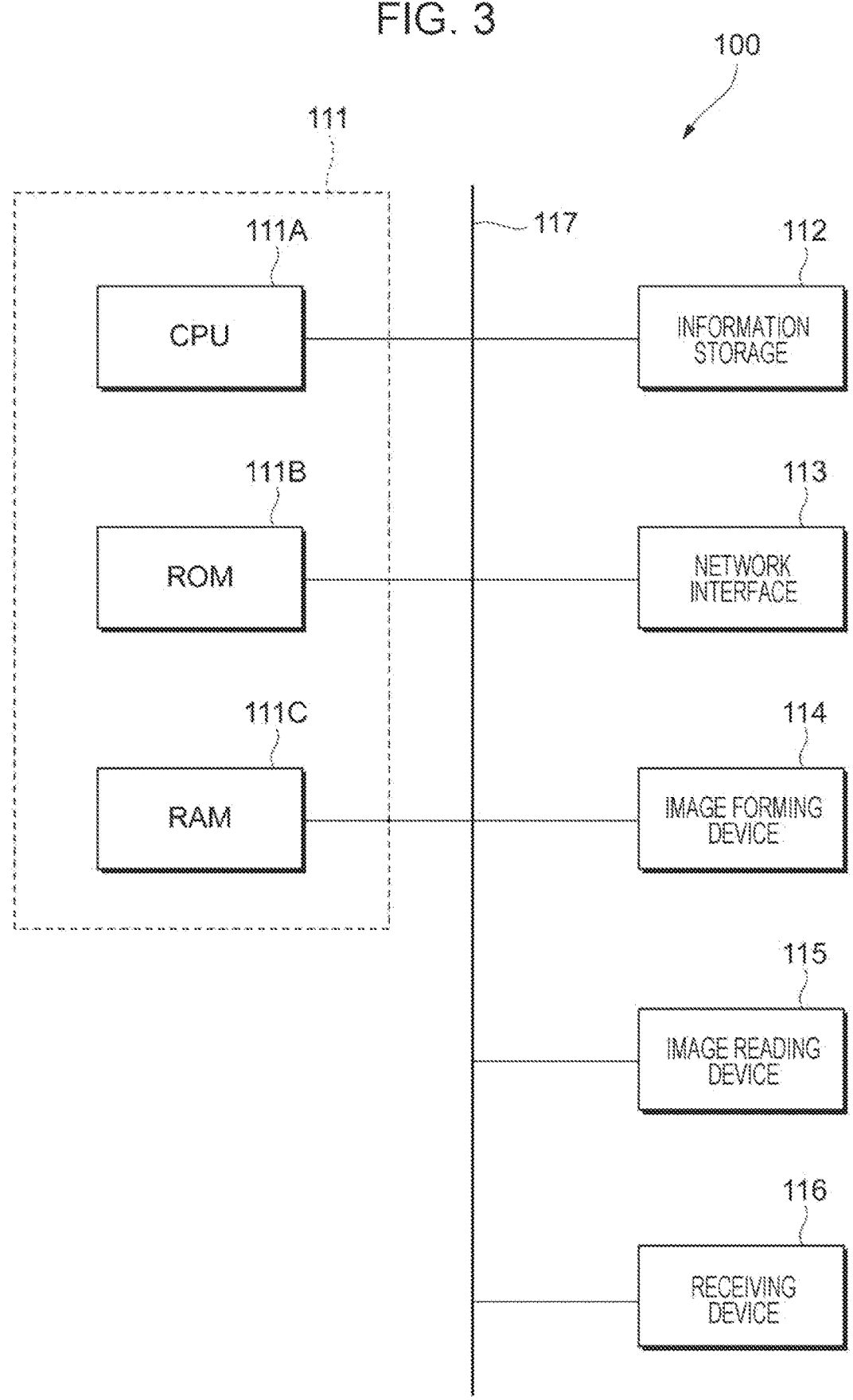
FIG. 3 illustrates a hardware configuration example of a terminal apparatus.
Figure 4:
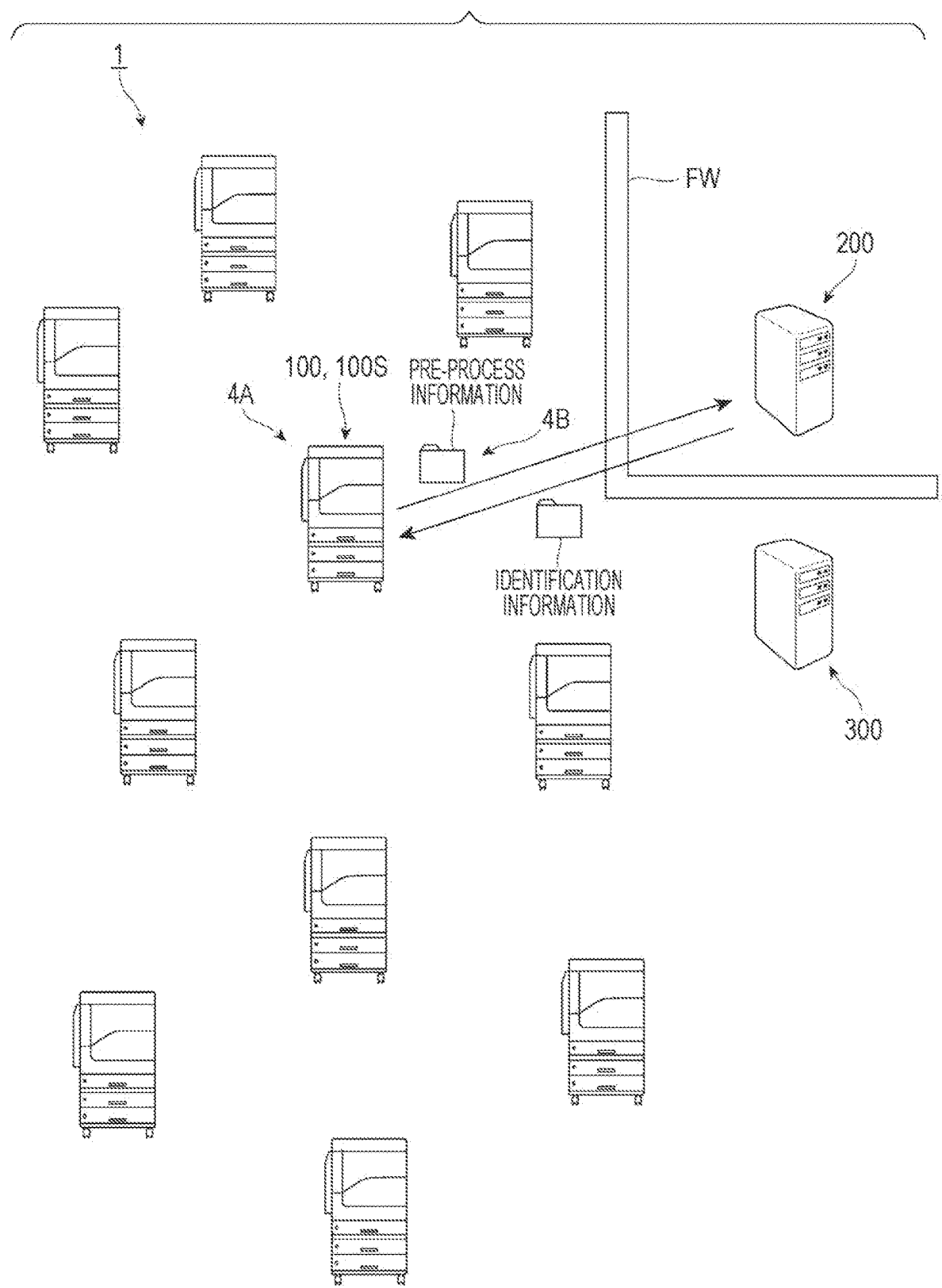
FIG. 4 illustrates an outline of a process performed by the information processing system.

FIG. 3 illustrates a hardware configuration example of the terminal apparatus 100. Referring to FIG. 3, the terminal apparatus 100 is an image forming apparatus. The terminal apparatus 100 includes an information processor 111, information storage 112 storing information, and network interface 113 performing communications via a LAN cable. The terminal apparatus 100 further includes an image forming device 114 that forms an image on a recording medium, such as a paper sheet, an image reading device 115 that reads an image on an original document, and a receiving device 116 that includes a touch panel and receives an instruction from a user.

The information processor 111 is a computer. The information processor 111 includes a CPU 111A serving as an example of a processor performing a variety of processes described below. The information processor 111 further includes a ROM 111B storing software and RAM 111C used as a work area. The information storage 112 is implemented by an available information recording device, such as a hard disk drive, semiconductor memory, or magnetic tape.

The image forming device 114 forms an image on a recording medium, such as a paper sheet, using an electrophotographic system or an ink-jet system. The image reading device 115 is a scanner that generates image data by reading an image on an original document placed on the scanner. The information processor 111, information storage 112, network interface 113, image forming device 114, image reading device 115, and receiving device 116 are connected to each other via a bus 117 or signal line (not illustrated).

A program to be executed by the CPU 111A may be delivered in a recorded state on a computer readable recording medium to the terminal apparatus 100. The computer readable recording medium may be a magnetic recording medium (such as a magnetic tape or a magnetic disk), optical recording medium (optical disk), magnetooptical recording medium, or semiconductor memory. The program to be executed by the CPU 111A may be delivered to the terminal apparatus 100 via a communication medium, such as the Internet.

In the exemplary embodiment, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment, the term "processor" is broad enough to encompass one processor or plural processors in collaboration which are located physically apart from each other but may work cooperatively. The order of operations of the processor is not limited to one described in the exemplary embodiments below and may be changed.

Each of the terminal apparatuses 100 is not limited to an apparatus having an image forming function. Each of the terminal apparatuses 100 may be a personal computer (PC). Alternatively, each of the terminal apparatuses 100 may be a portable apparatus, such as a smart phone, tablet terminal, smart watch, or game machine. The terminal apparatuses 100 may be of the same type or different types.

According to the exemplary embodiment, as illustrated in FIG. 1, one terminal apparatus 100 transmits pre-process information to the processing apparatus 200. Except when the one terminal apparatus 100 is powered off, the post-process information generated by the processing apparatus 200 is transmitted to the receiving apparatus 300 via the one terminal apparatus 100. According to the exemplary embodiment, the post-process information is returned to the terminal apparatus 100 having transmitted the pre-process information to the processing apparatus 200. The post-process information is then transmitted to the receiving apparatus 300 via the terminal apparatus 100.

FIGS. 4 through 8 illustrate outlines of processes performed by the information processing system 1. According to the exemplary embodiment, a user operates the one terminal apparatus 100 denoted by reference numeral 4A in FIG. 4 to read an image on an original document. In other words, the user places the original document on the image reading device 115 (see FIG. 3) and then scans the original document. The one terminal apparatus 100 thus acquires, as the pre-process information, image data acquired through reading the original document.

In this reading operation, the user enters to the one terminal apparatus 100 destination information indicating a destination of the image data acquired through reading. The entering may be performed by selecting the destination information pre-registered on the one terminal apparatus 100 denoted by reference numeral 4A or newly registering destination information on the one terminal apparatus 100. In this process example, information that is used to transmit the post-process information to the receiving apparatus 300 is entered as the destination information.

The CPU 111A (see FIG. 3) in the one terminal apparatus 100 performs an operation to transmit the pre-process information including the image data to the processing apparatus 200 as illustrated by reference numeral 4B. Specifically, information on the processing apparatus 200 is pre-registered on the one terminal apparatus 100 (hereinafter referred to as a transmitting terminal apparatus 100S). The CPU 111A in the transmitting terminal apparatus 100S transmits the pre-process information to the processing apparatus 200. The exemplary embodiment is based on the premise that the processing apparatus 200 serving as a destination of the pre-process information is pre-registered on each of the terminal apparatuses 100. The transmitting terminal apparatus 100S transmits the pre-process information to the processing apparatus 200 on which the terminal apparatus 100 is registered.

According to the exemplary embodiment, the processing apparatus 200 receives the pre-process information when the transmitting terminal apparatus 100S has transmitted the pre-process information. Upon receiving the pre-process information, the processing apparatus 200 transmits identification information issued thereby to the transmitting terminal apparatus 100S. The identification information is used for a terminal apparatus 100 other than the transmitting terminal apparatus 100S to acquire the post-process information from the processing apparatus 200 (as described in greater detail below).

The identification information is, for example, a random number, and generated by the processing apparatus 200. The identification information is not limited the random number. For example, the identification information may be a pre-determined fixed value. The identification information used to acquire the post-process information is transmitted from the processing apparatus 200 to the transmitting terminal apparatus 100S. When the processing apparatus 200 transmits the identification information to the transmitting terminal apparatus 100S, the CPU 111A in the transmitting terminal apparatus 100S performs an acquisition operation to acquire the identification information.

In this process example, when the processing apparatus 200 receives the pre-process information, the processing apparatus 200 starts an operation on the pre-process information. Specifically, the processing apparatus 200 performs image processing operations on the pre-process information including the image data, including an image synthesis operation and an optical character recognition/reader (OCR) operation. The operations performed by the processing apparatus 200 are not limited to the image processing operations and may include another type of operation as long as the operation is feasible via the computer.

Figure 5:
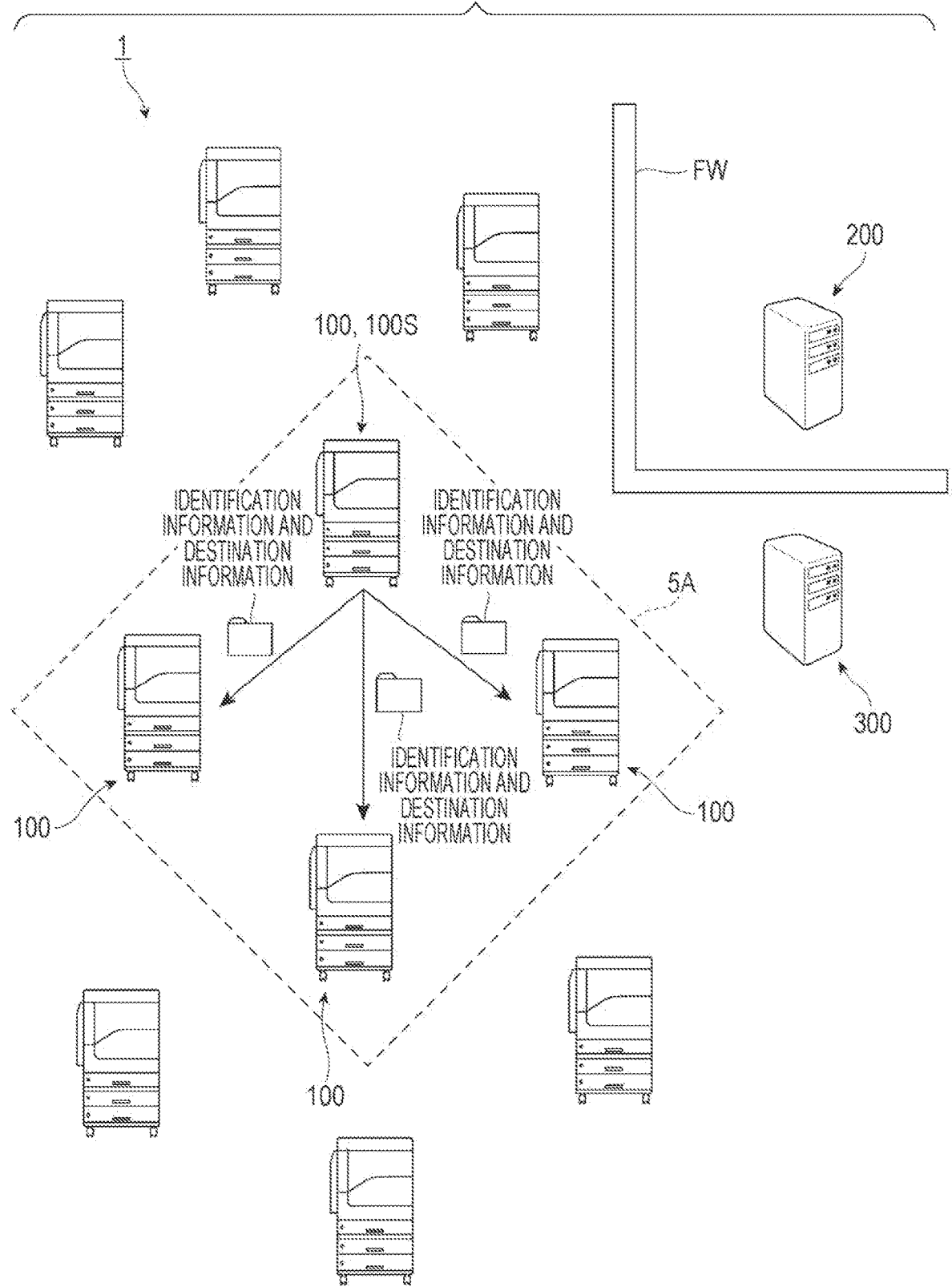
FIG. 5 illustrates an outline of a process performed by the information processing system.

According to the exemplary embodiment, as illustrated in FIG. 5, the CPU 111A in the transmitting terminal apparatus 100S transmits the identification information acquired from the processing apparatus 200 to each of the transmitting terminal apparatus 100 belonging an apparatus group satisfying a predetermined condition from among multiple apparatus groups (as described in greater detail below). Referring to FIG. 5, the terminal apparatuses 100 within an area defined by broken line denoted by reference numeral 5A are the terminal apparatuses 100 belonging to the apparatus group satisfying the predetermined condition.

Each of the terminal apparatuses 100 is enabled to transfer the post-process information to the receiving apparatus 300. In other words, each of the terminal apparatuses 100 is an apparatus that is enabled to acquire the post-process information from the processing apparatus 200 and transfer the acquired post-process information to the receiving apparatus 300 serving as the specific apparatus.

The CPU 111A in the transmitting terminal apparatus 100S transmits the identification information acquired from the processing apparatus 200 to each of the terminal apparatuses 100, belonging to the apparatus group satisfying the predetermined condition (hereinafter referred to as a "condition satisfying apparatus group"), from among multiple terminal apparatus groups of the terminal apparatuses 100 that are enabled to transfer the post-process information to the receiving apparatus 300. The terminal apparatus group and condition satisfying apparatus group are described in greater detail below.

In the process example described above, the terminal apparatuses 100 located within the area defined by the broken line denoted by reference numeral 5A are the terminal apparatuses 100 belonging to the condition satisfying apparatus group. The transmitting terminal apparatus 100S transmits the identification information to each of the terminal apparatuses 100 belonging the condition satisfying apparatus group.

According to the exemplary embodiment, the CPU 111A in the transmitting terminal apparatus 100S transmits the destination information input by the user to each of the terminal apparatuses 100 belonging to the condition satisfying apparatus group. Specifically, the CPU 111A in the transmitting terminal apparatus 100S transmits to each of the terminal apparatuses 100, belonging to the condition satisfying apparatus group, the destination information on the receiving apparatus 300 including an Internet Protocol (IP) address. In other words, the CPU 111A in the transmitting terminal apparatus 100S transmits information on the destination of the post-process information to each of the terminal apparatuses 100 belonging to the condition satisfying apparatus group. According to the exemplary embodiment, the transmitting terminal apparatus 100S codes the identification information and destination information and then transmits the coded identification information and destination information to each of the terminal apparatuses 100 belonging to the condition satisfying apparatus group.

Figure 6:
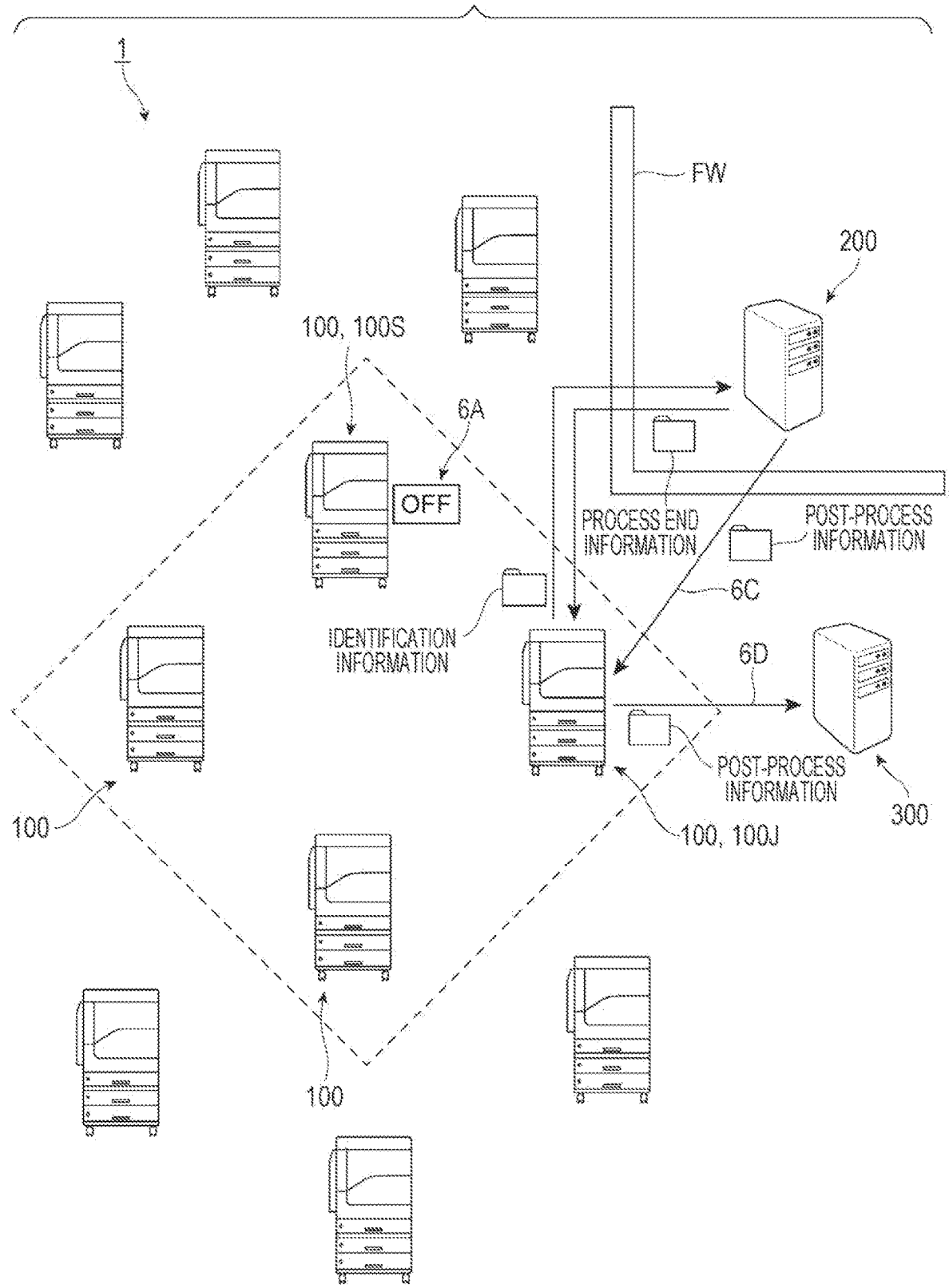
FIG. 6 illustrates an outline of a process performed by the information processing system.

In this process example, the transmitting terminal apparatus 100S is powered off as denoted by reference numeral 6A in FIG. 6. After completing the process, the processing apparatus 200 transmits information indicating the completion of the process (hereinafter referred to as "process completion information") to the terminal apparatuses 100 belonging to the condition satisfying apparatus group. Specifically, the processing apparatus 200 transmits the process completion information to terminal apparatuses 100, satisfying a predetermined condition, from among the terminal apparatuses 100.

According to the exemplary embodiment, the transmitting terminal apparatus 100S is powered off when the processing apparatus 200 transmits the process completion information. The processing apparatus 200 thus transmits the process completion information not to the transmitting terminal apparatus 100S but to a terminal apparatus 100 that belongs to the condition satisfying apparatus group and thus satisfies the predetermined condition.

The terminal apparatus 100 having received the process completion information (hereinafter referred to as a "reception terminal apparatus 100J") transmits to the processing apparatus 200 identification information used to acquire the post-process information. In other words, the reception terminal apparatus 100J as the terminal apparatus 100 satisfying the predetermined condition transmits to the processing apparatus 200 the identification information used to acquire the post-process information. The processing apparatus 200 thus receives the identification information from the reception terminal apparatus 100J.

The processing apparatus 200 checks the identification information transmitted therefrom to the transmitting terminal apparatus 100S against the identification information received from the reception terminal apparatus 100J. If the identification information transmitted from the processing apparatus 200 to the transmitting terminal apparatus 100S matches the identification information received from the reception terminal apparatus 100J, the processing apparatus 200 transmits the post-process information to the reception terminal apparatus 100J as denoted by reference numeral 6C.

In this process example, the reception terminal apparatus 100J acquires the post-process information and then transmits the acquired post-process information to the receiving apparatus 300 serving as an example of a specific apparatus other apparatus as denoted by reference numeral 6D. According to the exemplary embodiment, the reception terminal apparatus 100J transfers the post-process information from the processing apparatus 200 to the receiving apparatus 300 as the example of the specific apparatus.

As described above, the processing apparatus 200 issues the identification information. The issuer of the identification information is not limited to the processing apparatus 200. Alternatively, the identification information may be issued by the transmitting terminal apparatus 100S. In the same way as described above, the identification information issued by the transmitting terminal apparatus 100S is transmitted to each of the terminal apparatuses 100 belonging to the condition satisfying apparatus group. In other words, the identification information is transmitted to each of the terminal apparatuses 100 serving as a candidate of the reception terminal apparatus 100J receiving the process completion information.

In order to issue the identification information, the CPU 111A in the transmitting terminal apparatus 100S performs an operation to transmit the identification information to the processing apparatus 200. In this case, the processing apparatus 200 receives and stores the identification information. In this way, the processing apparatus 200 may check the identification information stored thereon against the identification information transmitted from the reception terminal apparatus 100J to the processing apparatus 200.

As described above, the CPU 111A in the transmitting terminal apparatus 100S transmits the identification information to each of the terminal apparatuses 100 belonging to the condition satisfying apparatus group. In this case, it may be optional that the CPU 111A in the transmitting terminal apparatus 100S does not transmit the identification information to a terminal apparatus 100 in a specific state from among the terminal apparatuses 100 belonging to the condition satisfying apparatus group. Specifically, it may be optional that the CPU 111A in the transmitting terminal apparatus 100S does not transmit the identification information to a terminal apparatus 100 that is not enabled to transfer the post-process information to the receiving apparatus 300, for example, a terminal apparatus 100 that remains powered off.

It may also be optional that the CPU 111A in the transmitting terminal apparatus 100S does not transmit the identification information to a terminal apparatus 100 that may involve a delay in the transfer of the post-process information to the receiving apparatus 300. From among the terminal apparatuses 100 belonging to the condition satisfying apparatus group, the terminal apparatus 100 that may involve the delay in the transfer of the post-process information may be a terminal apparatus 100 that is in the middle of an operation and under a higher processing load. In other words, the CPU 111A in the transmitting terminal apparatus 100S may possibly transmit the identification information to only a terminal apparatus 100 in a specific state from among the terminal apparatuses 100 belonging to the condition satisfying apparatus group.

Figure 7:
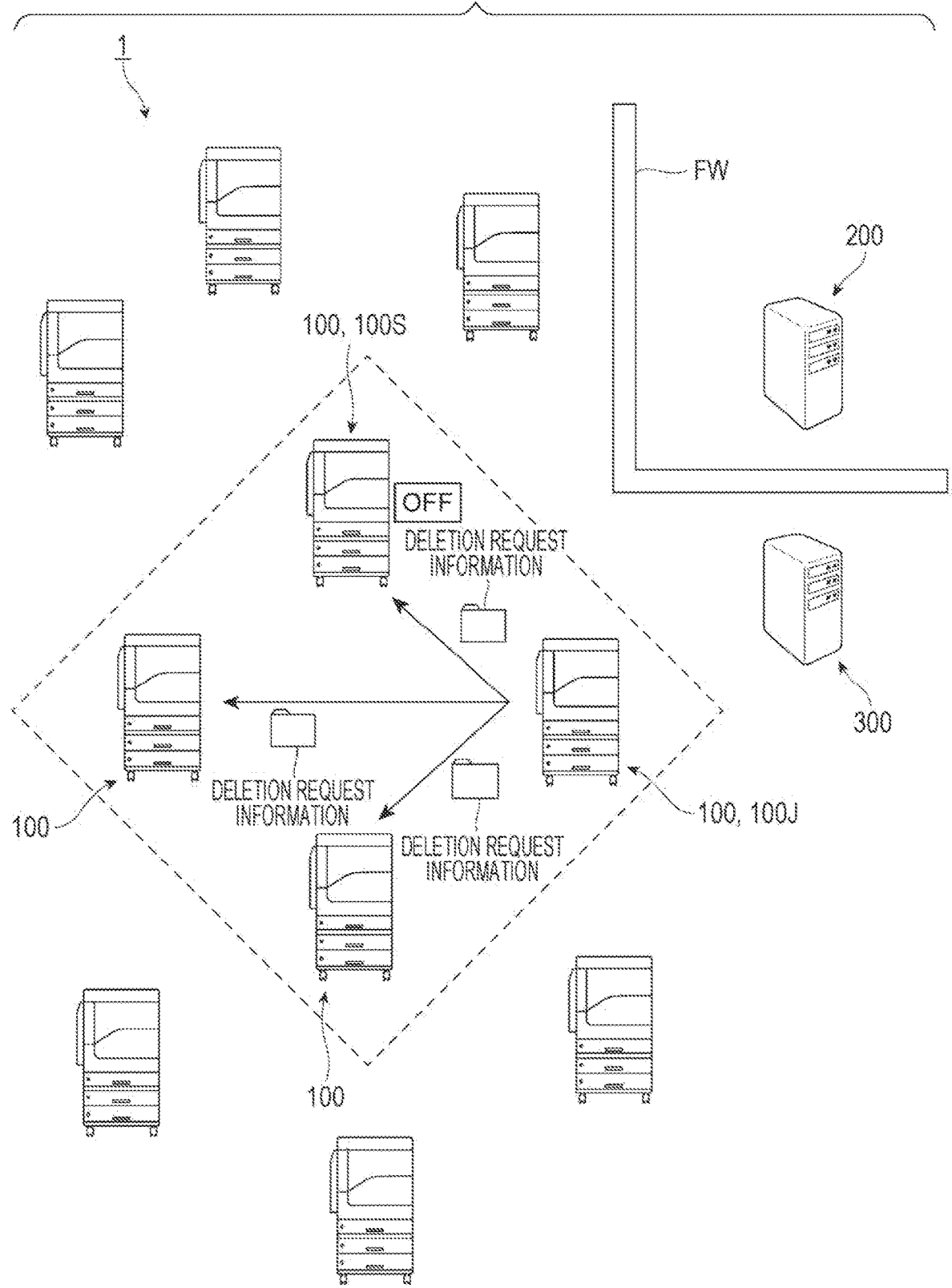
FIG. 7 illustrates an outline of a process performed by the information processing system.

According to the exemplary embodiment, referring to FIG. 7, the reception terminal apparatus 100J transmits deletion request information, requesting to delete the destination information and identification information, to each of the terminal apparatuses 100 belonging to the condition satisfying apparatus group. In response, each of the terminal apparatuses 100 belonging to the condition satisfying apparatus group deletes the destination information and identification information stored thereon. In this process example, the transmitting terminal apparatus 100S still remains powered off in the state in FIG. 7 and is thus unable to delete the destination information and identification information.

Figure 8:
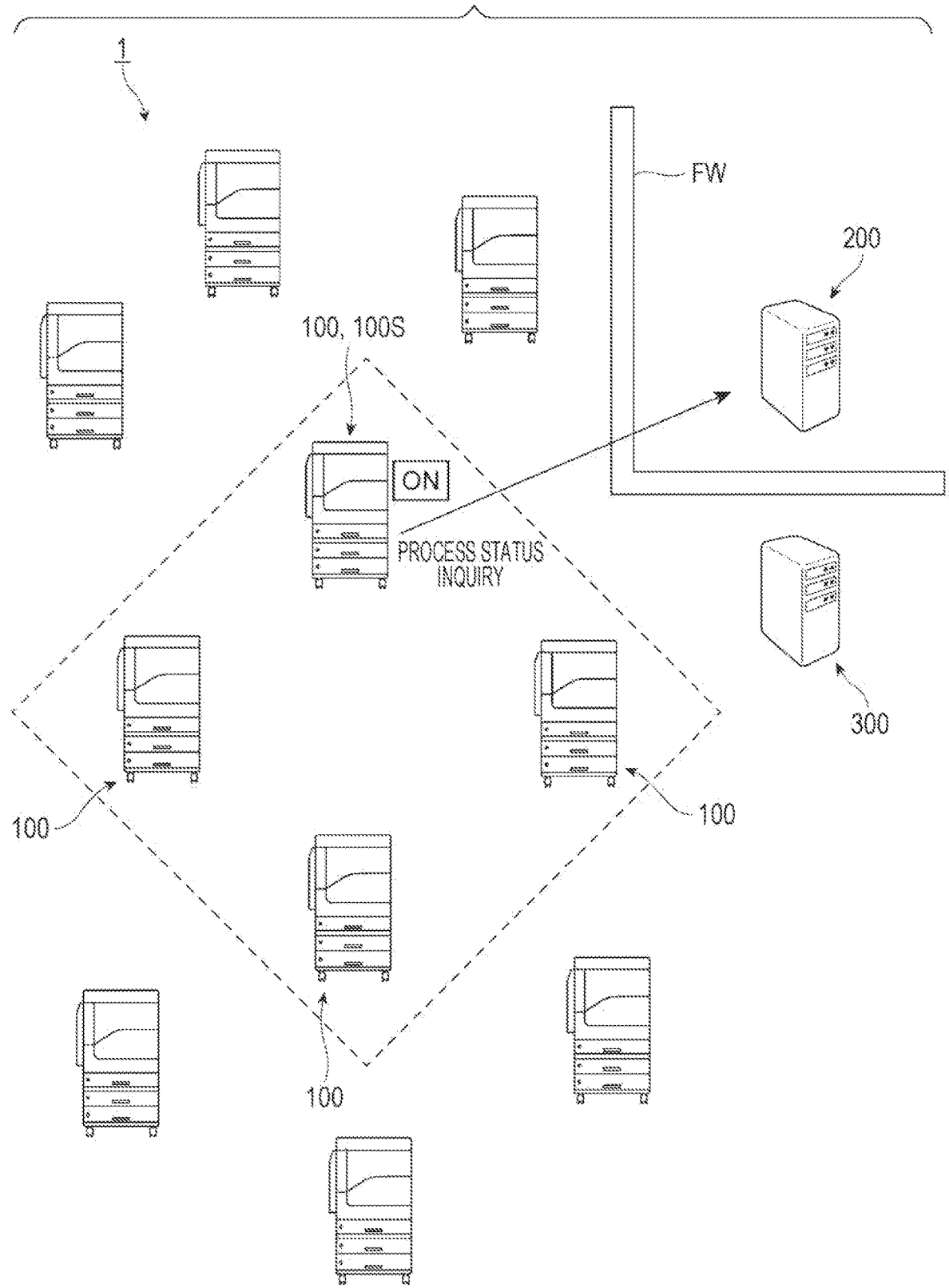
FIG. 8 illustrates an outline of a process performed by the information processing system.

FIG. 8 illustrates the information processing system 1 in the state where the transmitting terminal apparatus 100S is powered on. According to the exemplary embodiment, with the terminal apparatus 100 powered on, the transmitting terminal apparatus 100S inquires the processing apparatus 200 of the process status. If a notification of process completion or a notification of completion of the transmission of the post-process information is transmitted from the processing apparatus 200 to the transmitting terminal apparatus 100S, the transmitting terminal apparatus 100S deletes the destination information and identification information stored thereon.

If the transmitting terminal apparatus 100S is unable to inquire the processing apparatus 200 of the process status, the terminal apparatus 100 inquires a terminal apparatus 100 belonging to the condition satisfying apparatus group. When the transmitting terminal apparatus 100S receives the notification of process completion or the notification of completion of the transmission of the post-process information from the terminal apparatus 100 belonging to the condition satisfying apparatus group, the transmitting terminal apparatus 100S deletes the destination information and identification information therefrom.

According to the exemplary embodiment, an image processing operation on the image data acquired by the transmitting terminal apparatus 100S is not performed by the transmitting terminal apparatus 100S but by the processing apparatus 200 different from the transmitting terminal apparatus 100S. The image processing operation may be enhanced and increased in speed in comparison with the case in which the image processing operation is performed on each of the terminal apparatuses 100 that may be the transmitting terminal apparatus 100S. If the image processing operation is performed by the processing apparatus 200 in place of each of the terminal apparatuses 100, the hardware resources for the image processing operation may be easier to enhance and thus performance of the image processing operation may be improved. Enhancement and increase in speed of the image processing operation may thus be easier than when the image processing operation is performed on each of the terminal apparatuses 100.

According to the exemplary embodiment, the firewall FW is installed between the processing apparatus 200 serving as an example of an external apparatus and a network where multiple the terminal apparatuses 100 (see FIG. 1) and the receiving apparatus 300 are connected. When the post-process information is directly transmitted from the processing apparatus 200 to the receiving apparatus 300, the firewall FW is to be configured to authorize the transmission and security performance may possibly be degraded. The post-process information is not directly transmitted from the processing apparatus 200 to the receiving apparatus 300. Alternatively, the post-process information is first transmitted from the processing apparatus 200 to the terminal apparatus 100 and then transmitted to the receiving apparatus 300 via the terminal apparatus 100.

Figure 9:
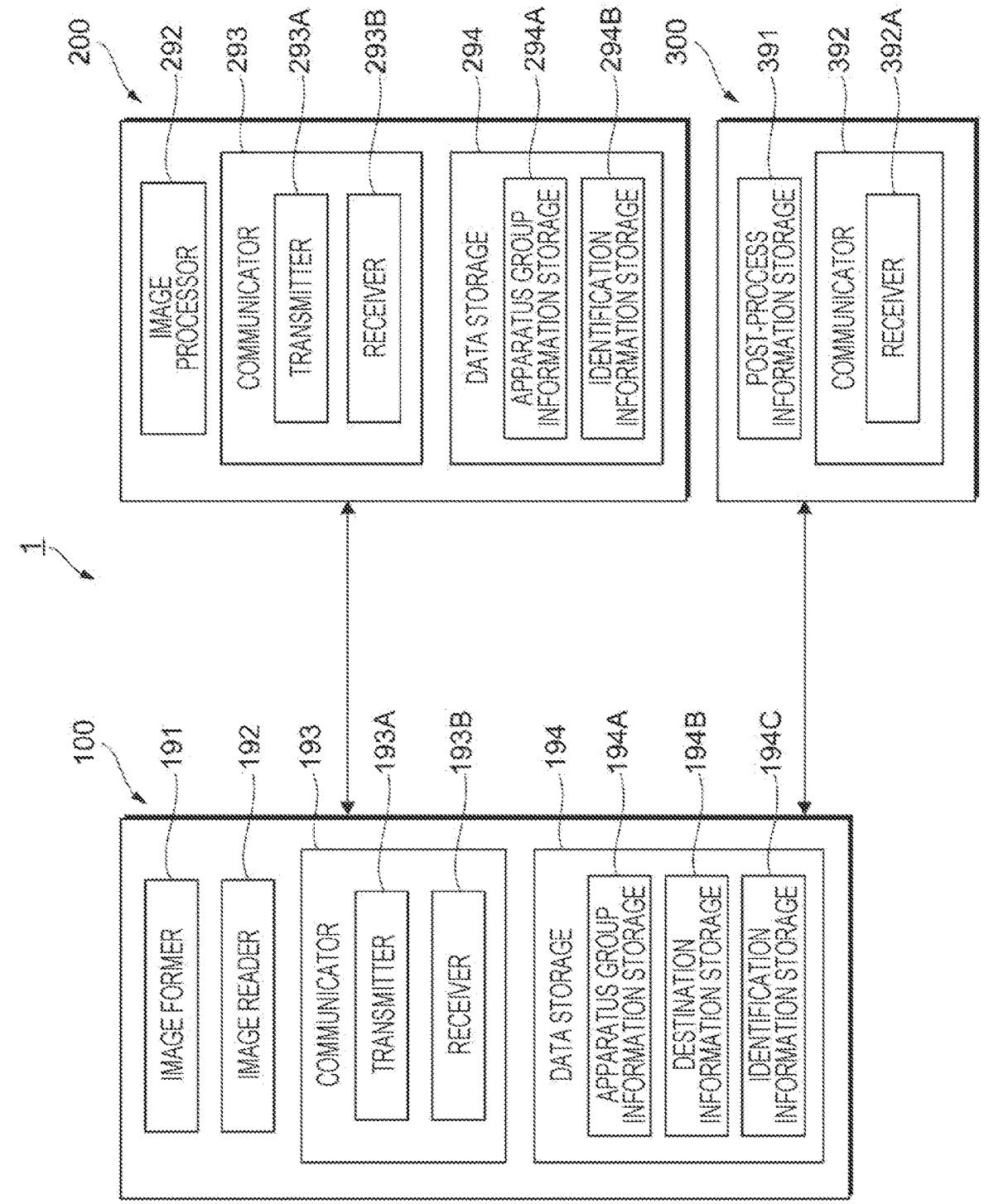
FIG. 9 illustrates functions of each apparatus forming the information processing system.

FIG. 9 illustrates functions of each apparatus forming the information processing system 1. The exemplary embodiment employs multiple the terminal apparatuses 100 as illustrated in FIG. 1. Referring to FIG. 9, a single terminal apparatus 100 is illustrated while the other terminal apparatuses 100 are not illustrated. Referring to FIG. 9, the terminal apparatus 100 includes an image former 191 that forms an image on a recording medium, such as a paper sheet. The terminal apparatus 100 also includes an image reader 192 that reads an image on an original document. The image former 191 is implemented by the image forming device 114 in FIG. 3 and the image reader 192 is implemented by the image reading device 115 in FIG. 3.

Each of the terminal apparatuses 100 includes a communicator 193 and data storage 194. The communicator 193 is implemented by the network interface 113 in FIG. 3. The communicator 193 includes a transmitter 193A transmitting information to the outside and a receiver 193B receiving information incoming from the outside. The data storage 194 is implemented by the information storage 112 in FIG. 3. The data storage 194 includes an apparatus group information storage 194A, destination information storage 194B, and identification information storage 194C.

The apparatus group information storage 194A stores information on the terminal apparatus group. Specifically, the apparatus group information storage 194A stores apparatus identification information and group identification information described below. The destination information storage 194B stores the destination information used to transmit the post-process information to the receiving apparatus 300. The identification information storage 194C stores the identification information used to acquire the post-process information.

The processing apparatus 200 includes an image processor 292. The image processor 292 is implemented when the CPU 211 (see FIG. 2) in the processing apparatus 200 executes a program stored on the ROM 212. The image processor 292 performs predetermined image processing operations, such as an image synthesis operation and an OCR operation, on the image data transmitted as the pre-process information from the transmitting terminal apparatus 100S. The processing apparatus 200 includes a communicator 293 and data storage 294. The communicator 293 is implemented by the network interface 203 in FIG. 2. The communicator 293 includes a transmitter 293A transmitting information to the outside and a receiver 293B receiving information from the outside. The data storage 294 is implemented by the information storage 202 (see FIG. 2). The data storage 294 includes an apparatus group information storage 294A and identification information storage 294B.

The apparatus group information storage 294A stores information on the terminal apparatus group. Specifically, the apparatus group information storage 294A stores the apparatus identification information and group identification information described below. The identification information storage 294B stores the identification information issued by the processing apparatus 200 and the transmitting terminal apparatus 100S. In other words, the identification information storage 294B stores the identification information that is used to check against the identification information transmitted from the reception terminal apparatus 100J.

The receiving apparatus 300 includes a post-process information storage 391 and communicator 392. The post-process information storage 391 is implemented by the information storage 202 in FIG. 2. The post-process information storage 391 stores the post-process information generated by the processing apparatus 200 and transferred by the terminal apparatus 100. The communicator 392 is implemented by the network interface 203 in FIG. 2. The communicator 392 includes a receiver 392A. The receiver 392A receives the post-process information generated by the processing apparatus 200 and transferred by the terminal apparatus 100.

FIGS. 10 through 13 illustrate sequences of processes performed by the information processing system 1. According to the exemplary embodiment, an administrator operates one of the terminal apparatuses 100 and registers information on the terminal apparatus group before the series of processes illustrated in FIGS. 4 through 8 are started.

In other words, according to the exemplary embodiment, the administrator pre-registers information on the terminal apparatus group. An apparatus operated by the administrator to register the information on the terminal apparatus group includes but is not limited to the terminal apparatus 100 or another apparatus connected to the terminal apparatus 100 or the processing apparatus 200.

The administrator operates the receiving device 116 (see FIG. 3) included in one terminal apparatuses 100 to enter information (the apparatus identification information) used to identify each of the terminal apparatuses 100 forming one terminal apparatus group (step S101). Specifically, the administrator enters, as the apparatus identification information, apparatus specifying information and address information identifying each of the terminal apparatuses 100 forming the terminal apparatus group. According to the exemplary embodiment, the administrator enters the apparatus identification information on a per registered terminal apparatus group basis.

Figure 10:
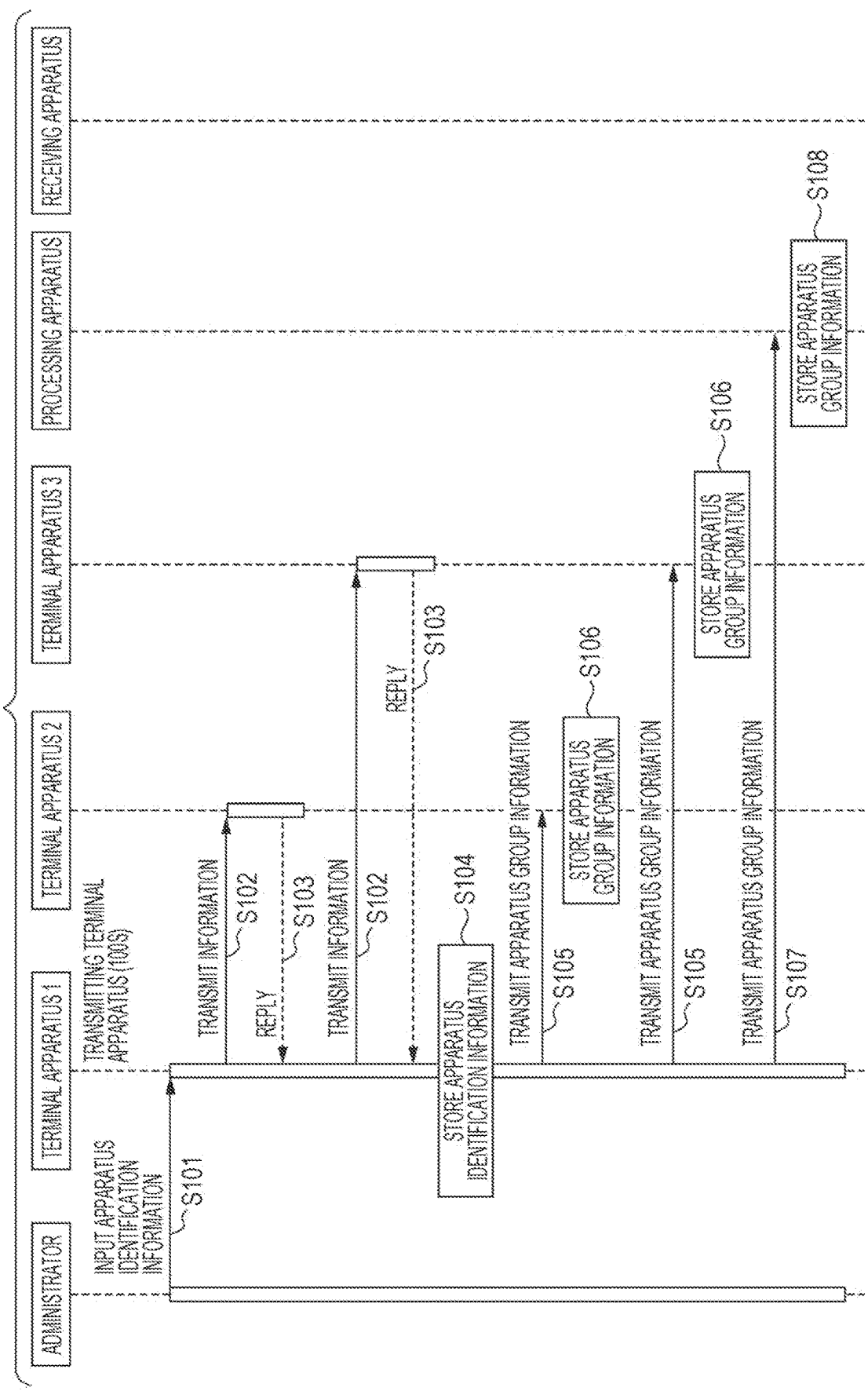
FIG. 10 illustrates a sequence of a process performed by the information processing system.

When the administrator enters the apparatus identification information via the one terminal apparatus 100, the one terminal apparatus 100 verifies that communication with each of the terminal apparatuses 100 identified by the apparatus identification information is possible. Specifically, the one terminal apparatus 100 transmits information to each of the terminal apparatuses 100 identified by the apparatus identification information (step S102) and then verifies the presence or absence of a reply from each of the terminal apparatuses 100. Referring to FIG. 10, each of the terminal apparatuses 100 has replied (step S103) and the one terminal apparatus 100 has communicated with each of the terminal apparatuses 100.

The one terminal apparatus 100 stores the apparatus identification information (step S104). Specifically, the one terminal apparatus 100 registers on the information storage 112 (see FIG. 3) the apparatus identification information and the group identification information that is linked to the apparatus identification information and used to identify the apparatus identification information from another piece of apparatus identification information. According to the exemplary embodiment, the apparatus identification information and group identification information linked to the apparatus identification information are also referred to as "apparatus group information."

The one terminal apparatus 100 transmits the apparatus group information to each of the terminal apparatuses 100 identified by the apparatus identification information (step S105). In this process example, the terminal apparatuses 100 identified by the apparatus identification information included in the apparatus group information are terminal apparatuses 1 through 3. The one terminal apparatus 100 transmits the apparatus group information to each of the terminal apparatuses 2 and 3. Each of the terminal apparatuses 2 and 3 receives and stores the apparatus group information (step S106). Specifically, each of the terminal apparatuses 2 and 3 registers the apparatus group information on the information storage 112 thereof (see FIG. 3).

The one terminal apparatus 100 also transmits the apparatus group information to the processing apparatus 200 (step S107). The processing apparatus 200 receives and stores the apparatus group information (step S108). Specifically, the processing apparatus 200 registers the apparatus group information on the information storage 202 (see FIG. 2). Through the process described above, the processing apparatus 200 and each of the terminal apparatuses 100 identified by the apparatus identification information included in the apparatus group information store the apparatus identification information, included in the apparatus group information, and the group identification information linked to the apparatus identification information.

Figure 11:
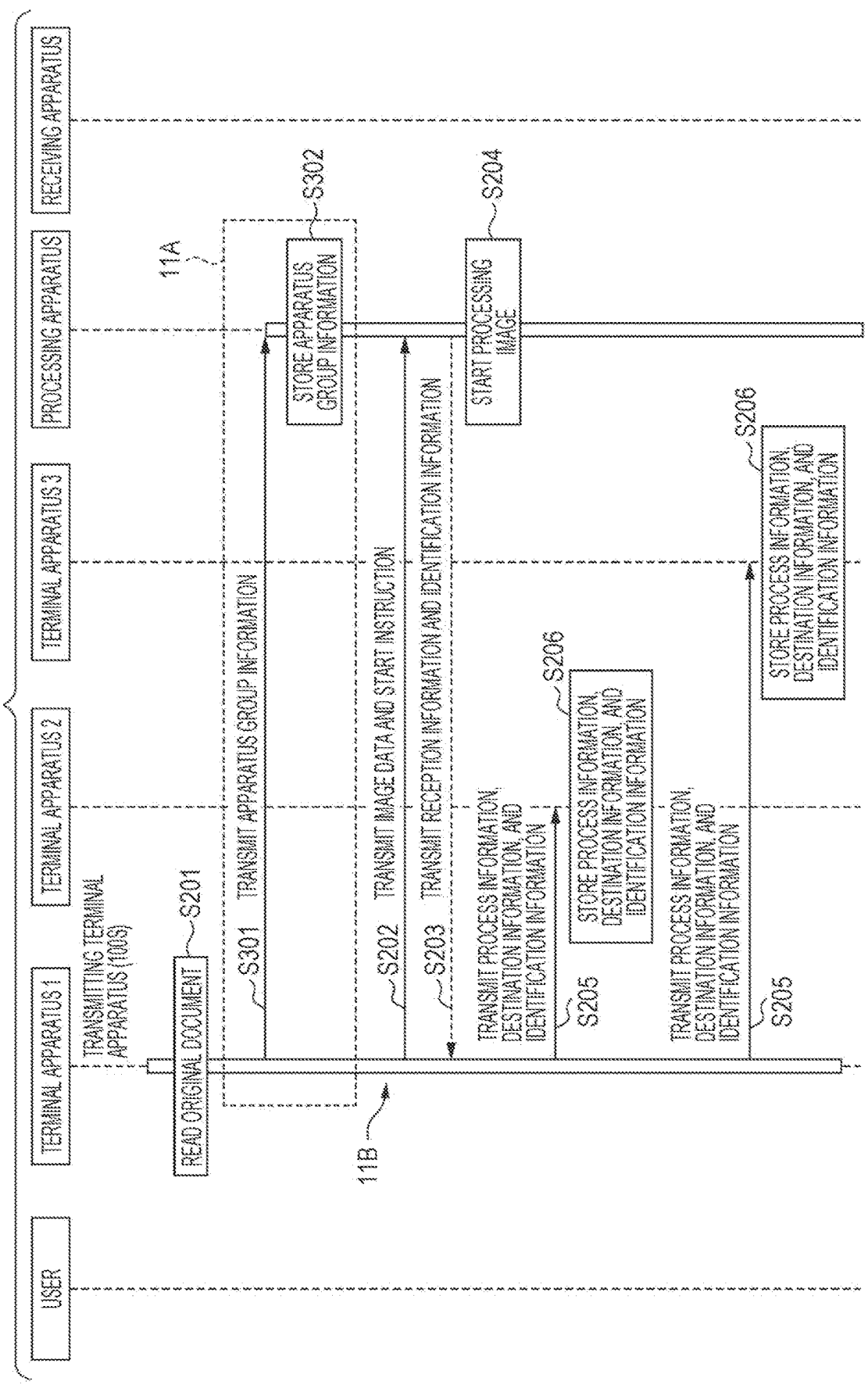
FIG. 11 illustrates a sequence of a process performed by the information processing system.

FIG. 11 illustrates the flow of the process where the user reads an original document using the transmitting terminal apparatus 100S. In the process in FIG. 11, the user reads the original document by operating the transmitting terminal apparatus 100S (step S201). In this process example, the transmitting terminal apparatus 100S is the terminal apparatus 1 and the user reads the original document by operating the terminal apparatus 1. Specifically, the user places the original document on the image reading device 115 (see FIG. 3) and reads the image on the original document. The transmitting terminal apparatus 100S thus generates image data.

In the process example, an operation in step S202 denoted by reference numeral 11B is then performed. In the operation in step S202, the transmitting terminal apparatus 100S transmits the image data as the pre-process information to the processing apparatus 200 and also transmits a start instruction of the image processing operation to the processing apparatus 200. Upon receiving the image data and start instruction, the processing apparatus 200 transmits to the transmitting terminal apparatus 100S reception information indicating that the information has been received (step S203). In the process, the processing apparatus 200 transmits the identification information to the transmitting terminal apparatus 100S (step S203).

The processing apparatus 200 starts the image processing operation on the image data from the transmitting terminal apparatus 100S (step S204). The transmitting terminal apparatus 100S then transmits information indicating that the image processing operation is currently in progress (hereinafter referred to as "process information"), destination information and identification information to each of the terminal apparatuses 100 identified by the apparatus identification information included in the apparatus group information registered on the transmitting terminal apparatus 100S (step S205). The identification information is the identification information transmitted from the processing apparatus 200.

According to the exemplary embodiment, the apparatus group information is registered on the information storage 112 in the transmitting terminal apparatus 100S. The transmitting terminal apparatus 100S thus acquires the apparatus group information by reading the apparatus group information from the information storage 112. The transmitting terminal apparatus 100S thus transmits the process information, destination information, and identification information to each of the terminal apparatuses 100 identified by the apparatus identification information included in the apparatus group information. Specifically, the transmitting terminal apparatus 100S transmits the process information, destination information, and identification information to each of the terminal apparatuses 100 belonging to a condition satisfying apparatus group (described below).

Specifically, the terminal apparatuses 100 belonging to the condition satisfying apparatus group are the apparatuses 1 through 3. The apparatus 1 serving as the transmitting terminal apparatus 100S transmits the process information, destination information, and identification information to each of the apparatuses 2 and 3. Each of the apparatuses 2 and 3 receives and stores these pieces of information. Specifically, each of the apparatuses 2 and 3 stores the process information, destination information, and identification information (step S206).

When the user starts reading the original document by operating the transmitting terminal apparatus 100S, no apparatus group information may possibly be registered on the processing apparatus 200. Specifically, multiple processing apparatuses 200 may be registered on the terminal apparatus 100 that may be the transmitting terminal apparatus 100S. It may happen that the apparatus group information may not be registered on some of these processing apparatuses 200. Specifically, a new processing apparatus 200 may possibly be registered after the apparatus group information is registered on the terminal apparatus 100. In such a case, the apparatus group information is not registered on the new processing apparatus 200.

According to the exemplary embodiment, as denoted by reference numeral 11A in FIG. 11, the transmitting terminal apparatus 100S transmits the apparatus group information thereof to the new processing apparatus 200 (step S301). In this way, the new processing apparatus 200 stores the apparatus group information (step S302). Even if the transmitting terminal apparatus 100S is powered off, the processing apparatus 200 may transmit the post-process information to the receiving apparatus 300 via another terminal apparatus 100.

The manner of transmission of the destination information from the transmitting terminal apparatus 100S to a terminal apparatus 100 other than the transmitting terminal apparatus 100S is not limited to any particular manner. For example, the destination information may be transmitted from the transmitting terminal apparatus 100S to each of the other terminal apparatuses 100. Also, for example, an image, such as a two-dimensional code, representing the destination information, may be formed on an original document placed on the transmitting terminal apparatus 100S. In such a case, when the original document is read on the transmitting terminal apparatus 100S, the image representing the destination information is also read. The image data acquired by reading the original document thus includes the destination information.

In the above case, the destination information is transmitted to the other terminal apparatus 100 by transmitting the image data to the other terminal apparatus 100. The destination information is thus acquired by analyzing the image data. Moreover, if the image, such as the two-dimensional code, representing the destination information is formed on the original document, the transmitting terminal apparatus 100S may acquire the destination information by analyzing the image data after reading the original document. The destination information thus acquired may be transmitted to the other terminal apparatus 100.

Figure 12:
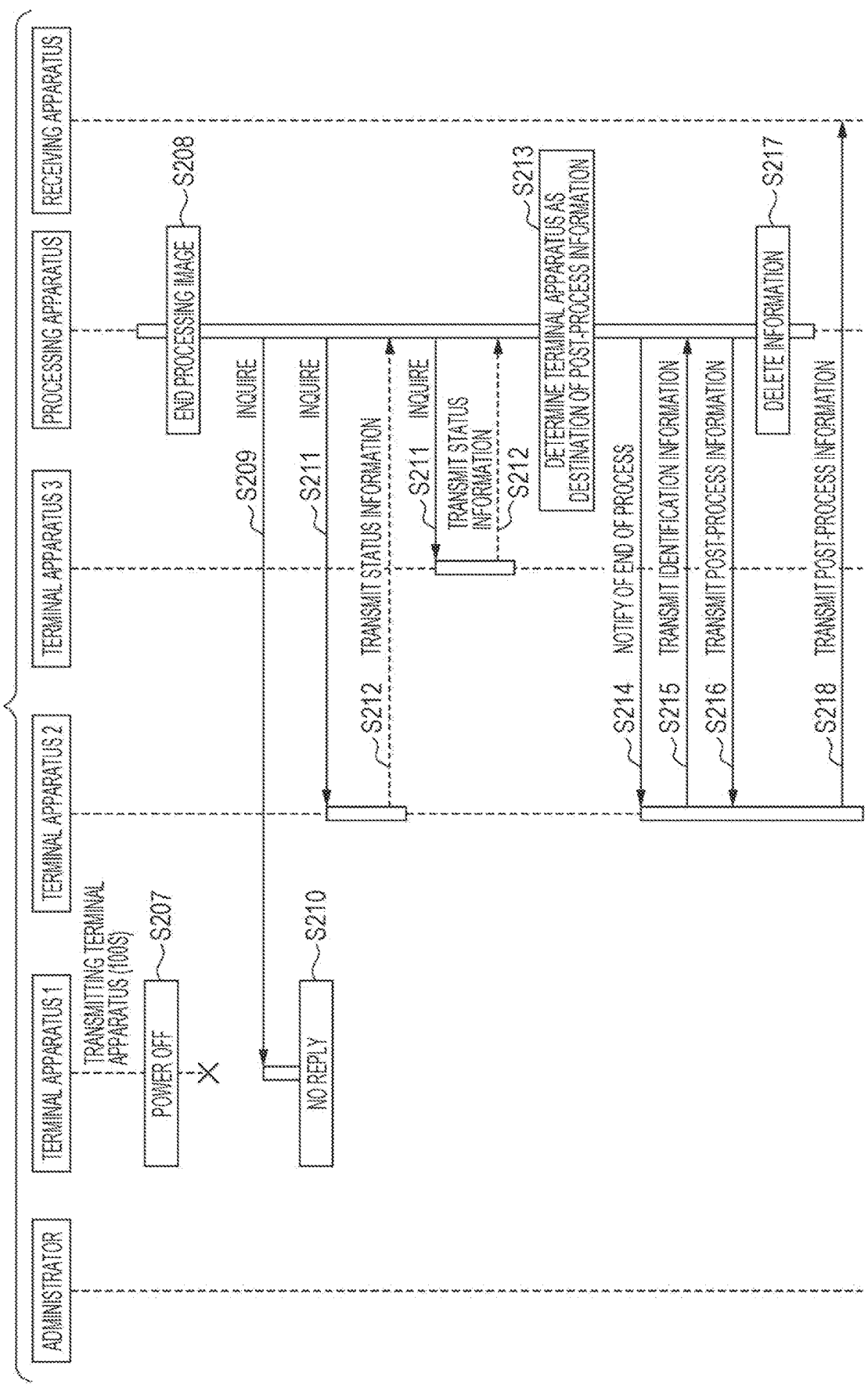
FIG. 12 illustrates a sequence of a process performed by the information processing system.

In this process example, the terminal apparatus 1 serving as the transmitting terminal apparatus 100S is powered off as illustrated in FIG. 12 (step S207). In other words, the post-process information is difficult to transfer via the transmitting terminal apparatus 100S. In this process example, as well, after the image processing operation is performed on the image data on the processing apparatus 200 (step S208), the post-process information is generated. In the process example, the processing apparatus 200 inquires the transmitting terminal apparatus 100S serving as a source of the image data as to whether communication is possible (step S209). In the process example, the transmitting terminal apparatus 100S is powered off and no reply is received from the transmitting terminal apparatus 100S (step S210).

The processing apparatus 200 inquires each of the apparatuses 2 and 3 serving as the terminal apparatuses 100 identified by the apparatus group information as to the status (step S211). In the process example, each of the apparatuses 2 and 3 transmits information (status information) on the status of each of the terminal apparatuses 100 to the processing apparatus 200 (step S212). The status information includes information on an available capacity of the information storage 112 in each of the apparatuses 2 and 3 and information on a job progress status in each of the apparatuses 2 and 3.

Upon receiving the status information, the processing apparatus 200 determines the terminal apparatus 100 as a destination of the post-process information in accordance with the acquired status information (step S213). The processing apparatus 200 notifies the determined terminal apparatus 100 of a process end notification notifying of the end of the image processing operation (step S214). In this process example, the apparatus 2 is determined to be the terminal apparatus 100 serving as the destination of the post-process information. The processing apparatus 200 thus transmits the process end notification.

According to the exemplary embodiment, the processing apparatus 200 thus acquires the status information on the apparatuses 2 and 3. The status information includes the information on the available capacity of the information storage 112 and the information on the job progress status. Moreover, the processing apparatus 200 may further acquire the status information on the apparatuses 2 and 3 that includes information indicating whether communication with the processing apparatus 200 is possible and information on the number of jobs currently being performed on each of the terminal apparatuses 100.

Based on these pieces of information, the processing apparatus 200 determines the terminal apparatus 100 that serves as the destination of the post-process information. Specifically, based on these pieces of information, the processing apparatus 200 identifies a terminal apparatus 100 that is powered on and under a lower processing load and determines the identified terminal apparatus 100 as the destination of the post-process information. As described above, the apparatus 2 is thus determined to be the terminal apparatus 100 serving as the destination of the post-process information. In this case, the processing apparatus 200 first transmits the process end notification to the apparatus 2.

In response, the apparatus 2 transmits the identification information thereof to the processing apparatus 200 (step S215). The processing apparatus 200 checks the identification information thereof against the identification information received from the apparatus 2. In the process example, the two pieces of the identification information match each other and the processing apparatus 200 transmits the post-process information to the apparatus 2 (step S216). In this way, the apparatus 2 acquires the post-process information.

In step S213, the number of terminal apparatuses 100 that the processing apparatus 200 determines first may be plural. In such a case, the processing apparatus 200 performs an operation to reduce the number of terminal apparatuses 100 to one. Specifically, the processing apparatus 200 evaluates on a per determination criterion basis each of the terminal apparatuses 100 serving as a destination candidate of the post-process information. According to each determination criterion, the processing apparatus 200 determines whether it is possible to narrow multiple terminal apparatuses 100 down to one terminal apparatus 100.

If the processing apparatus 200 determines that it is possible to narrow multiple terminal apparatuses 100 down to one terminal apparatus 100, the one terminal apparatus 100 is thus determined to be the terminal apparatus 100 as the destination of the post-process information. If it is not possible that the terminal apparatuses 100 are narrowed down to one terminal apparatus 100, each of the terminal apparatuses 100 is evaluated according to a next evaluation criterion. According to the next criterion, the processing apparatus 200 determines whether it is possible that the terminal apparatuses 100 are narrowed to one terminal apparatus 100. If it is possible that the terminal apparatuses 100 are narrowed to one terminal apparatus 100, the processing apparatus 200 determines the one terminal apparatus 100 to be the terminal apparatus 100 as the destination of the post-process information. The processing apparatus 200 iterates this operation until the terminal apparatuses 100 are narrowed to one terminal apparatus 100.

The determination criteria used to narrow the terminal apparatuses 100 may include a determination criterion as to whether the user has logged in on the terminal apparatus 100, a determination criterion as to whether a job is in progress on the terminal apparatus 100, and a determination criterion as to an available capacity of the information storage 112.

Even with the last determination criterion of multiple determination criteria, it may be difficult to narrow to one terminal apparatus 100. In such a case, the terminal apparatuses 100 are narrowed to one terminal apparatus 100 according to the apparatus specifying information, such as a registration number, linked to each of the terminal apparatuses 100 related to the apparatus identification information. Specifically, a terminal apparatus 100 having the smallest value as the apparatus specifying information or a terminal apparatus 100 having the largest value as the apparatus specifying information may be determined to be one terminal apparatus 100. The terminal apparatuses 100 are thus narrowed to the one terminal apparatus 100.

Figure 13:
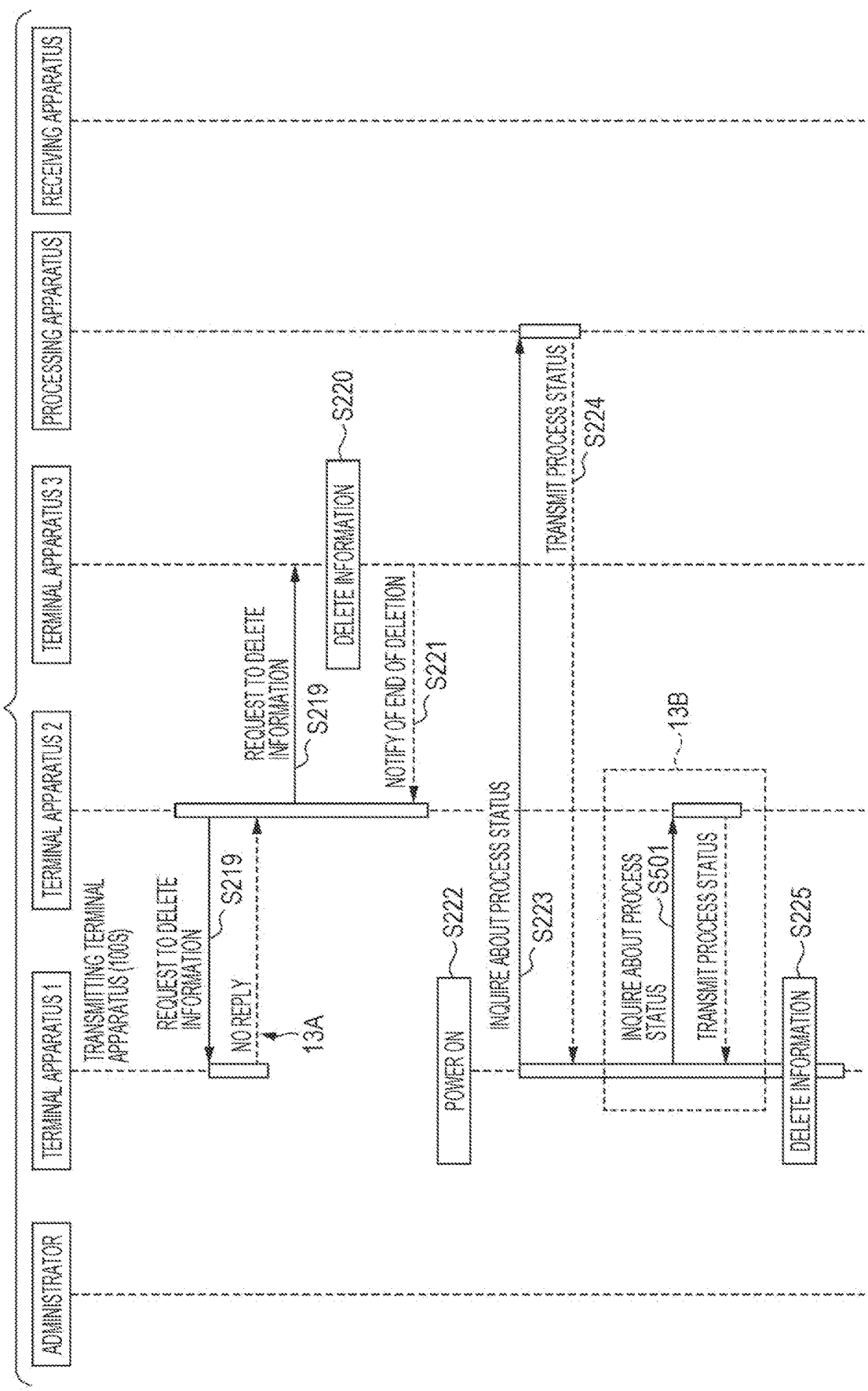
FIG. 13 illustrates a sequence of a process performed by the information processing system.

In the process example, then, the processing apparatus 200 deletes information stored thereon (step S217). Specifically, the processing apparatus 200 deletes the post-process information and identification information. Also in the process example, the apparatus 2 having acquired the post-process information transmits the post-process information to the receiving apparatus 300 serving as a transmission destination (step S218). In this way, the post-process information is stored on the receiving apparatus 300. Referring to FIG. 13, the apparatus 2 transmits an information deletion request to each of the apparatus 1 and apparatus 3 (step S219).

In response, the apparatus 3 deletes information (step S220). Specifically, the apparatus 3 deletes the destination information and identification information. The apparatus 3 notifies the apparatus 2 of the completion of the deletion (step S221). In the process example, the apparatus 1 still remains powered off and no reply is returned from the apparatus 1 as denoted by reference numeral 13A. The apparatus 1 does not delete the destination information and identification information.

In the process example later, the apparatus 1 as the transmitting terminal apparatus 100S is powered on (step S222). When the apparatus 1 is powered on, the apparatus 1 inquires the processing apparatus 200 of the process status (step S223). In response, the processing apparatus 200 transmits information on the process status to the apparatus 1 (step S224). Specifically, information indicating the completion of the process is transmitted. In other words, the processing apparatus 200 transmits to the apparatus 1 information indicating that the post-process information has been transmitted.

In response to the reception of the information indicating the completion of the process, the apparatus 1 deletes the stored information (step S225). Specifically, the apparatus 1 deletes the destination information and the identification information. If the apparatus 1 is unable to inquire the processing apparatus 200 of the process status, the apparatus 1 inquires the apparatuses 2 and 3 of the process status as denoted by reference numeral 13B (step S501)

According to the exemplary embodiment, in principle, the post-process information is transmitted to the receiving apparatus 300 via the transmitting terminal apparatus 100S. If the apparatus 1 as the transmitting terminal apparatus 100S is powered off, the transmission of the post-process information to the receiving apparatus 300 may be difficult or delayed. According to the exemplary embodiment, in contrast, another terminal apparatus 100 such as the apparatus 2 transmits the post-process information in place of the transmitting terminal apparatus 100S. It may be less likely that the transmission of the post-process information to the receiving apparatus 300 is difficult or delayed.

According to the exemplary embodiment, if another terminal apparatus 100, such as the apparatus 2, in place of the transmitting terminal apparatus 100S transmits the post-process information, the two pieces of the identification information are checked against each other as described above. If the two pieces of the identification information match each other, the post-process information is transmitted to the other terminal apparatus 100 and is then transmitted to the receiving apparatus 300 via the other terminal apparatus 100. If a determination as to whether the two pieces of the identification information match each other is made in this way, the accessing of an unscrupulous user to the processing apparatus 200 via the terminal apparatus 100 may be controlled and leakage of the image data may also be controlled.

In the process example described above, if the transmitting terminal apparatus 100S is powered off, another terminal apparatus 100 transfers the post-process information. The post-process information is transferred via the one terminal apparatus 100 not only when the transmitting terminal apparatus 100S is powered off but also when the transmitting terminal apparatus 100S is in a sleep mode or when the load on the transmitting terminal apparatus 100S exceeds a predetermined threshold. According to the exemplary embodiment, if a predetermined condition is satisfied, for example, the transmitting terminal apparatus 100S is powered off, another terminal apparatus 100 transfers the post-process information.

In other words, if the transmitting terminal apparatus 100S is in a specific state, the other terminal apparatus 100 transfers the post-process information. In the process example described above, if the transmitting terminal apparatus 100S is in the specific state, the processing apparatus 200 transmits the post-process information to the other terminal apparatus 100 and the post-process information is thus transmitted to the receiving apparatus 300. The specific states include not only the power-off state but also the sleep mode or the state in which the load exceeds the predetermined threshold.

According to the exemplary embodiment, the apparatus group information is transmitted to the processing apparatus 200 that has been registered on a terminal apparatus 100 (hereinafter referred to as an "operation terminal apparatus 100") that has been operated by the administrator to register the apparatus group information as denoted by step S107 in FIG. 10. In other words, the apparatus group information is registered on the processing apparatus 200 that has been registered on the operation terminal apparatus 100.

The apparatus group information may be transmitted to each of the other processing apparatuses 200 registered on each of the terminal apparatuses 100 having received the apparatus group information. The apparatus group information may thus be registered on each of the other processing terminals 200. According to the exemplary embodiment, the processing apparatus 200 is individually registered on each terminal apparatus 100. In such a case, if the apparatus group information is registered on the processing apparatus 200 registered on the operation terminal apparatus 100, the apparatus group information is not registered on a processing apparatus 200 that is registered on another terminal apparatus 100 different from the operation terminal apparatus 100.

In order to register the apparatus group information on the processing apparatus 200 registered on another terminal apparatus 100 different from the operation terminal apparatus 100, the apparatus group information may be transmitted to a processing apparatus 200 registered on the other terminal apparatus 100. Specifically, upon receiving the apparatus group information, the other terminal apparatus 100 transmits the apparatus group information to the processing apparatus 200 registered thereon. In this way, the apparatus group information is registered on the other processing apparatus 200.

In this case, the apparatus group information is registered on the other processing apparatus 200 not registered on the operation terminal apparatus 100 but registered on the terminal apparatus 100 other than the operation terminal apparatus 100. The user may now place an original document on the other terminal apparatus 100 and transmit the pre-process information to a processing apparatus 200 (hereinafter referred to as the "other processing apparatus 200") registered on the other terminal apparatus 100.

In this case, if the other terminal apparatus 100 corresponding to the transmitting terminal apparatus 100S is later powered off with the apparatus group information not registered on the other processing apparatus 200, the post-process information generated on the other processing apparatus 200 is difficult to transmit to a terminal apparatus 100 other than the transmitting terminal apparatus 100S. In contrast, if the apparatus group information is transmitted to and registered on the other processing apparatus 200, the other processing apparatus 200 may transmit the post-process information to the terminal apparatus 100 other than the transmitting terminal apparatus 100S.

Another method may be used to register the apparatus group information on each of the other processing apparatuses 200. For example, in another method, from each of the other terminal apparatuses 100 identified by the apparatus group information, the operation terminal apparatus 100 may acquire information on the processing apparatus 200 (hereinafter referred to as "processing apparatus information") registered on each of the other terminal apparatuses 100. In this case, the operation terminal apparatus 100 transmits the apparatus group information to each of the processing apparatuses 200 identified by the processing apparatus information.

In other words, in this method, the CPU 111A in the operation terminal apparatus 100 transmits the apparatus group information to the processing apparatus 200 that is registered on each of the terminal apparatuses 100 belonging to the terminal apparatus group and processes the pre-process information. In such a case, the apparatus group information is registered on each of the processing apparatuses 200 registered on the other terminal apparatus 100.

The exemplary embodiment may include multiple processing apparatuses 200 different from each other in terms of process contents. Specifically, the processing apparatuses 200 different from each other in terms of process contents may include a processing apparatus 200 that performs an image synthesis operation on an image in accordance with the image data and a processing apparatus 200 that performs an OCR operation on the image data. According to the exemplary embodiment, multiple processing apparatuses 200 different from each other in terms of process contents may be registered on a terminal apparatus 100. The process contents of a processing apparatus 200 registered on a terminal apparatus 100 may be different from the process contents of a processing apparatus 200 registered on another terminal apparatus 100.

According to the exemplary embodiment, by performing the process described above, the apparatus identification information and the group identification information may be transmitted to the processing apparatus 200 that is present when the apparatus identification information is input to the operation terminal apparatus 100. In other words, the apparatus group information may be transmitted to the processing apparatus 200 that is present when the apparatus identification information is input to the operation terminal apparatus 100. In this way, the apparatus identification information and group identification information may be registered on the processing apparatus 200 that is present when the apparatus identification information is input to the operation terminal apparatus 100.

On the other hand, according to the exemplary embodiment, the apparatus identification information and group identification information are difficult to register on a new processing apparatus 200 that is not present when the apparatus identification information is input to the operation terminal apparatus 100 but is registered after the apparatus identification information is input. In such a case, even when the new processing apparatus 200 has generated the post-process information with the pre-process information received from the transmitting terminal apparatus 100S, the post-process information is difficult to transmit to the receiving apparatus 300 via the terminal apparatuses 100 other than the transmitting terminal apparatus 100S.

According to the exemplary embodiment, when the transmitting terminal apparatus 100S transmits the pre-process information to the new processing apparatus 200 having neither the apparatus identification information and nor the group identification information, the transmitting terminal apparatus 100S is configured to transmit to the new processing apparatus 200 the apparatus group information (the apparatus identification information and group identification information) stored on the transmitting terminal apparatus 100S as denoted by reference numeral 11A in FIG. 11. The new processing apparatus 200 thus stores the apparatus identification information and group identification information. Even with the transmitting terminal apparatus 100S powered off, the post-process information may be transmitted to the receiving apparatus 300 via another terminal apparatus 100.

As described with reference to FIG. 11, after the image data serving as the pre-process information is transmitted to and uploaded to the processing apparatus 200, the destination information and identification information are transmitted to a terminal apparatus 100 other than the transmitting terminal apparatus 100S. Alternatively, the transmission of these pieces of information to the other terminal apparatus 100 may be performed before starting the transmission of the pre-process information to the processing apparatus 200. Specifically, before the transmission of the pre-process information to the processing apparatus 200, the CPU 111A in the transmitting terminal apparatus 100S starts transmitting the destination information and identification information to each of the other terminal apparatuses 100 belonging to the condition satisfying apparatus group.

Specifically, the transmission of these pieces of the information (the destination information and identification information) to the other terminal apparatuses 100 may start before reading an image on an original document. In other words, the transmission of the destination information and identification information to the other terminal apparatuses 100 may start before scanning the original document on the transmitting terminal apparatus 100S. Specifically, the transmission of the destination information and identification information to the other terminal apparatuses 100 may start before the operation in step S201 in FIG. 11. If the transmission of the destination information and identification information to the other terminal apparatuses 100 starts before scanning the original document, the transmission of the destination information and identification information to the other terminal apparatuses 100 and scanning the original document on the transmitting terminal apparatus 100S are performed in parallel. Process time may thus be shortened.

In particular, the process time may be shortened when reading the original document takes time, such as when the number of the other terminal apparatuses 100 serving as destinations of information is larger and the number of original documents is larger. When the transmission of the destination information and identification information to the other terminal apparatuses 100 starts before scanning the image on the original document, the transmitting terminal apparatus 100S is configured to acquire the identification information before reading the image on the original document. Specifically, the transmitting terminal apparatus 100S may make an acquisition request for the identification information to the processing apparatus 200 and may acquire the identification information before reading the image on the original document.

The transmission of the destination information and identification information to each of the other terminal apparatuses 100 belonging to the condition satisfying apparatus group may now start before transmitting the pre-process information to the processing apparatus 200. For example, after the reading of the image on the original document and before the transmission of the pre-process information to the processing apparatus 200, the transmission of the destination information and identification information may start. In other words, the transmission of the destination information and identification information to each of the other terminal apparatuses 100 may start even after the generation of the pre-process information but before the transmission of the pre-process information to the processing apparatus 200.

Specifically, the transmission of the destination information and identification information to each of the other terminal apparatuses 100 may start after the operation in step S201 in FIG. 11 and before the operation in step S202 in FIG. 11. In this case, as well, the transmission of the destination information and identification information to each of the other terminal apparatuses 100 and the transmission of the pre-process information to the processing apparatus 200 may be performed in parallel. The process time may thus be reduced. In the same way as described above, the transmitting terminal apparatus 100S may acquire the identification information from the processing apparatus 200 before the transmission of the pre-process information to the processing apparatus 200.

In yet another process, the transmission of the destination information and identification information to each of the other terminal apparatuses 100 may be performed when the transmission of the post-process information from the transmitting terminal apparatus 100S to the receiving apparatus 300 is determined to be difficult. Specifically, the transmission of the destination information and identification information to each of the other terminal apparatuses 100 may be performed when the transmitting terminal apparatus 100S is in a specific state, for example, when the transmitting terminal apparatus 100S is powered off or when the load on the transmitting terminal apparatus 100S exceeds a predetermined threshold.

If the transmitting terminal apparatus 100S shifts into the specific state, the transmitting terminal apparatus 100S makes the acquisition request for the identification information to the processing apparatus 200 and acquires the identification information. The transmitting terminal apparatus 100S transmits the destination information and identification information to the other terminal apparatuses 100. Only when the transmitting terminal apparatus 100S is in the specific state, the destination information and identification information are transmitted. The process is thus complete within the three apparatuses including the transmitting terminal apparatus 100S, processing apparatus 200, and receiving apparatus 300.

In operations in step S209 and step S211 (see FIG. 12), the processing apparatus 200 makes an inquiry to each of all the terminal apparatuses 100 belonging to the condition satisfying apparatus group and the status of each of the terminal apparatuses 100 is verified. In other words, in operations in step S209 and step S211, the processing apparatus 200 makes an inquiry to each of all the terminal apparatuses 100 identified by the apparatus identification information to verify the status of each of all the terminal apparatuses 100. Alternatively, an inquiry may be successively performed to each of the terminal apparatuses 100 belonging to the condition satisfying apparatus group. If the terminal apparatus 100 satisfying a predetermined condition is detected, no further inquiry may be made.

When the processing apparatus 200 transmits the post-process information to the terminal apparatuses 100, all the terminal apparatuses 100 serving as destination candidates may be powered off or the number of terminal apparatuses 100 identified by the apparatus identification information is only one and that terminal apparatus 100 may be powered off. In such a case, the processing apparatus 200 suspends the transmission of the post-process information. In other words, the processing apparatus 200 may quit the transmission of the post-process information. For example, when the terminal apparatus 100 is powered on, causing the processing apparatus 200 to be enabled to communicate with the terminal apparatus 100, the post-process information may be transmitted to the terminal apparatus 100 that is currently communicable.

According to the exemplary embodiment, as described above, each of the terminal apparatuses 100 and the processing apparatus 200 store the apparatus group information. In other words, each of the terminal apparatuses 100 and the processing apparatus 200 store the apparatus group information, including the apparatus identification information and the group identification information linked to the apparatus identification information. The number of pieces of the apparatus group information stored on each of the terminal apparatuses 100 and the processing apparatus 200 is not limited to one. Each of the terminal apparatuses 100 and the processing apparatus 200 may possibly store multiple pieces of the apparatus group information.

For example, multiple pieces of apparatus group information may be registered by the administrator. In such a case, each of the terminal apparatuses 100 and the processing apparatus 200 store the multiple pieces of the apparatus group information. Multiple terminal apparatus groups may thus be present. Information on each of the terminal apparatus groups is registered on each of the terminal apparatuses 100 and the processing apparatus 200.

If there are multiple terminal apparatus groups, the processing apparatus 200 sets each of the terminal apparatuses 100, belonging to a given condition satisfying apparatus group satisfying a predetermined condition from among the terminal apparatus groups, to be a terminal apparatus 100 serving as a destination candidate of the post-process information. Also, if there are multiple terminal apparatus groups, the transmitting terminal apparatus 100S transmits the destination information and identification information to each of the terminal apparatuses 100 belonging to the given condition satisfying apparatus group, satisfying the predetermined condition, from among the terminal apparatus groups.

In this arrangement, the destination information and identification information are not transmitted to a terminal apparatus 100 belonging to a terminal apparatus group not satisfying the predetermined condition. Information leaks may be less likely to occur in comparison than when the destination information and identification information are simply transmitted to all the terminal apparatuses 100. The identification information used to acquire the post-process information is thus transmitted to each of the terminal apparatuses 100 belonging to the given condition satisfying apparatus group satisfying the predetermined condition from among the terminal apparatus groups. Also, according to the exemplary embodiment, the destination information is transmitted to each of the terminal apparatuses 100 belonging to the condition satisfying apparatus group.

The terminal apparatus group satisfying the predetermined condition may be a terminal apparatus group that the transmitting terminal apparatus 100S belongs to from among the multiple terminal apparatus groups. In such a case, the processing apparatus 200 sets each of the terminal apparatuses 100, belonging to the terminal apparatus group of the transmitting terminal apparatus 100S from among the multiple terminal apparatus groups, to be a terminal apparatus 100 serving as a destination candidate of the post-process information. In order to transmit the post-process information to the terminal apparatus 100 other than the transmitting terminal apparatus 100S, the processing apparatus 200 transmits the post-process information to one of the terminal apparatuses 100 included in the destination candidates.

The transmitting terminal apparatus 100S having acquired the identification information from the processing apparatus 200 transmits the destination information and identification information to each of the terminal apparatuses 100 of the terminal apparatus group that the transmission terminal apparatus 100S belongs to. In other words, the transmission terminal apparatus 100S transmits the destination information and identification information to each of the terminal apparatuses 100 identified by the apparatus identification information including the information on the transmitting terminal apparatus 100S.

The terminal apparatus group satisfying the predetermined condition may also be a terminal apparatus group specified by a user. In such a case, the processing apparatus 200 sets each of the terminal apparatuses 100 belonging to the terminal apparatus group specified by the user to be a destination candidate of the post-process information. In order to transmit the post-process information to each of the terminal apparatuses 100 other than the transmitting terminal apparatus 100S, the processing apparatus 200 transmits the post-process information to one of the terminal apparatuses 100 included in the destination candidates. The transmitting terminal apparatus 100S having received the identification information from the processing apparatus 200 transmits the destination information and identification information to each of the terminal apparatuses 100 belonging to the terminal apparatus group specified by the user from among the terminal apparatus groups The specifying of the terminal apparatus group by the user may be implemented in response to a user operation performed on the receiving device 116 (see FIG. 3) in the transmitting terminal apparatus 100S. In this case, the user specifies the terminal apparatus group by operating the receiving device 116 in the transmitting terminal apparatus 100S. Specifically, the user selects the group identification information linked to each piece of the apparatus identification information by operating the receiving device 116 in the transmitting terminal apparatus 100S.

The transmitting terminal apparatus 100S transmits the information on the terminal apparatus group specified by the user to the processing apparatus 200. Specifically, the transmitting terminal apparatus 100S transmits the group identification information selected by the user to the processing apparatus 200. The transmitting terminal apparatus 100S also transmits the destination information and identification information to each of the terminal apparatuses 100 belonging to the terminal apparatus group specified by the user. In other words, the transmitting terminal apparatus 100S transmits the identification information from the processing apparatus 200 and the destination information to each of the terminal apparatuses 100 identified by the apparatus identification information linked to the group identification information selected by the user.

If the transmitting terminal apparatus 100S is powered off as described above, the processing apparatus 200 transmits the post-process information to one of the terminal apparatuses 100 belonging to the terminal apparatus group specified by the user. Specifically, the processing apparatus 200 transmits the post-process information to a terminal apparatus 100 satisfying a predetermined condition, such as a terminal apparatus 100 that is powered on and under a lower processing load, from among the terminal apparatuses 100 belonging to the terminal apparatus group specified by the user. The terminal apparatus 100 having received the post-process information then transmits the post-process information to the receiving apparatus 300 using the destination information transmitted from the transmitting terminal apparatus 100S.

The terminal apparatus group satisfying the predetermined condition may include a terminal apparatus group linked to user information. In such a case, the processing apparatus 200 sets each of the terminal apparatuses 100, belonging to the terminal apparatus group linked to the user information from among the terminal apparatus groups, to be the terminal apparatus 100 as a destination candidate of the post-process information.

In order to transmit the post-process information to a terminal apparatus 100 other than the transmitting terminal apparatus 100S, the processing apparatus 200 transmits the post-process information to one of the terminal apparatuses 100 included in the destination candidates. Specifically, as described above, the processing apparatus 200 transmits the post-process information to a terminal apparatus 100 satisfying the predetermined condition, such as a terminal apparatus 100 that is powered on and under a lower processing load, from among the terminal apparatuses 100 included in the destination candidates. The terminal apparatus 100S having received the post-process information then transmits the destination information and identification information to each of the terminal apparatuses 100 belonging to the terminal apparatus group linked to the user information.

When the destination information and identification information are transmitted to each of the terminal apparatuses 100 belonging to the terminal apparatus group linked to the user information, the CPU 111A in the transmitting terminal apparatus 100S acquires the user information on the user who has placed the original document on the transmitting terminal apparatus 100S. In other words, the CPU 111A in the transmitting terminal apparatus 100S acquires the user information on the user who is going to perform an operation using the transmitting terminal apparatus 100S. The user information is non-limiting and may be any information that is related to the user. For example, the user information may be related to the attribute of the user, for example, the name, age, sex, employment status, or organization of the user.

The CPU 111A in the transmitting terminal apparatus 100S acquires, as the user information, for example, information from an identification (ID) card from the transmitting terminal apparatus 100S when the user holds the IC card over the transmitting terminal apparatus 100S. The CPU 111A in the transmitting terminal apparatus 100S transmits the user information to the processing apparatus 200. In accordance with the user information, the processing apparatus 200 identifies the terminal apparatus 100 serving as a destination candidate of the post-process information.

Specifically, the processing apparatus 200 identifies the terminal apparatus 100, belonging to the terminal apparatus group linked to the user information, as a destination candidate of the post-process information. The CPU 111A in the transmitting terminal apparatus 100S transmits the identification information from the processing apparatus 200 and the destination information to each of the terminal apparatuses 100 belonging to the terminal apparatus group linked to the user information.

If the transmitting terminal apparatus 100S is powered off as described above, the processing apparatus 200 transmits the post-process information to one of the terminal apparatuses 100 belonging to the terminal apparatus group linked to the user information. Specifically, in the same way as described above, the processing apparatus 200 transmits the post-process information to a terminal apparatus 100, satisfying the predetermined condition, from among the terminal apparatuses 100 belonging to the terminal apparatus group linked to the user information. The terminal apparatus 100 having received the post-process information transmits the post-process information to the receiving apparatus 300 in accordance with the destination information transmitted from the transmitting terminal apparatus 100S.

In order to perform the process described above, the user information is linked to each piece of the apparatus group information. The apparatus group information and user information in a linked state are registered on each of the terminal apparatus 100 and processing apparatus 200. Specifically, the apparatus group information and user information are registered on the information storage 112 (see FIG. 3) in the terminal apparatus 100 and the information storage 202 (see FIG. 2) in the processing apparatus 200.

When the user information is received, the transmitting terminal apparatus 100S transmits the user information to the processing apparatus 200. When the user information is received, the processing apparatus 200 identifies a terminal apparatus 100, serving as a destination candidate of the post-process information, in accordance with the apparatus group information linked to the user information. In other words, the processing apparatus 200 identifies the terminal apparatus 100, identified by the apparatus group information, as a terminal apparatus 100 serving as a destination candidate of the post-process information.

When the transmitting terminal apparatus 100S is powered off, the processing apparatus 200 transmits the post-process information to one of the terminal apparatuses 100 included in the destination candidates. Specifically, in the same way as described above, the processing apparatus 200 transmits the post-process information to a terminal apparatus 100, satisfying the predetermined condition, from among the terminal apparatuses 100 included in the destination candidates. When the user information is acquired, the transmitting terminal apparatus 100S identifies a destination of the identification information and destination information in accordance with the apparatus group information linked to the user information. The transmitting terminal apparatus 100S transmits the identification information and destination information to the identified destination (the terminal apparatus 100).

When the identification information is transmitted to each of the terminal apparatuses 100 belonging to the terminal apparatus group linked to the user information, the post-process information acquired by the processing apparatus 200 may be transmitted to the receiving apparatus 300 via the terminal apparatus 100 that is used by a specific organization of the user. In such a case, leakage of the post-process information may be less likely to occur than when the post-process information is transmitted to the receiving apparatus 300 via a terminal apparatus 100 other than the terminal apparatus 100 used by the specific organization.

The terminal apparatus group satisfying the predetermined condition may be a terminal apparatus group linked to specific information included in the pre-process information. In such a case, the CPU 111A in the transmitting terminal apparatus 100S having acquired the identification information from the processing apparatus 200 transmits the identification information to each of the terminal apparatuses 100 belonging to the terminal apparatus group linked to the specific information included in the pre-process information.

In this process, each piece of the apparatus group information is beforehand linked to the specific information. The apparatus group information and specific information in a linked state are registered on each of the terminal apparatuses 100 and the processing apparatus 200. In such a case, if the acquired pre-process information includes the specific information, the processing apparatus 200 identifies a terminal apparatus 100 serving as a destination candidate of the post-process information in accordance with the specific information.

Specifically, the processing apparatus 200 identifies one terminal apparatus group in accordance with the specific information included in the acquired pre-process information. The processing apparatus 200 identifies each of the terminal apparatuses 100 belonging to the one identified terminal apparatus group as a terminal apparatus 100 serving as a destination candidate of the post-process information. When the terminal apparatus 100 is powered off in the same way as described above, the processing apparatus 200 transmits the post-process information to a terminal apparatus 100, satisfying the predetermined condition, from among the identified terminal apparatuses 100.

If the specific information is included in the pre-process information, the transmitting terminal apparatus 100S identifies a terminal apparatus 100, serving as a destination candidate of the identification information and destination information, in accordance with the apparatus group information linked to the specific information. Specifically, the transmitting terminal apparatus 100S identifies each of the terminal apparatuses 100, identified by the apparatus identification information linked to the specific information, as a terminal apparatus 100 serving as a destination of the identification information and destination information. The transmitting terminal apparatus 100S transmits the identification information and destination information to each of the identified terminal apparatuses 100.

The specific information included in the pre-process information may be, for example, information representing a specific image. Specifically, the pre-process information may be image data and thus information representing an image. In such a case, if the pre-process information forming the image data includes information representing the specific image, the identification information may be transmitted to each of the terminal apparatuses 100 belonging to the terminal apparatus group linked to the information on the specific image. The post-process information may also be transmitted to one of the terminal apparatuses 100 belonging to the terminal apparatus group. For example, the specific image may be a text image, such as the word "Confidential."

The text image may be construed as information representing a type of the original document placed on the transmitting terminal apparatus 100S. If the information representing the type of the original document is included in the pre-process information, a terminal apparatus 100 serving as a destination candidate of the post-process information may be identified in accordance with the information representing the type of the original document and a terminal apparatus 100 serving as a destination candidate of the identification information and destination information may also be identified in accordance with the information representing the type of the original document. If this operation is performed, the information indicating the type is beforehand linked to each piece of the apparatus group information in the same way as described above.

The terminal apparatus group satisfying the predetermined condition may further be a terminal apparatus group that is linked to a file name attached to the image data that is acquired via reading the original document on the transmitting terminal apparatus 100S or a terminal apparatus group that is linked to setting information set in the reading. In such a case, the CPU 111A in the transmitting terminal apparatus 100S having acquired the identification information from the processing apparatus 200 transmits the identification information to each of the terminal apparatuses 100, belonging to the terminal apparatus group linked to the file name or the setting information, from among the terminal apparatus groups.

In this process, the file name and setting information are beforehand linked to each piece of the apparatus group information. The apparatus group information and file name or the apparatus group information and setting information in a linked state are registered on each of the terminal apparatuses 100 and the processing apparatus 200. When the file name or the setting information is received from the transmitting terminal apparatus 100S, the processing apparatus 200 identifies a terminal apparatus 100 serving as a destination candidate of the post-process information in accordance with the file name or the setting information.

Specifically, the processing apparatus 200 identifies one terminal apparatus group in accordance with the file name or the setting information. The processing apparatus 200 identifies each of the terminal apparatuses 100, belonging to the one identified terminal apparatus group, as a terminal apparatus 100 serving as a destination candidate of the post-process information. In the same way as described above, when the transmitting terminal apparatus 100S is powered off, the processing apparatus 200 transmits the post-process information to a terminal apparatus 100 satisfying the predetermined condition from among the identified terminal apparatuses 100.

In accordance with the apparatus group information linked to the file name or the setting information, the transmitting terminal apparatus 100S identifies a terminal apparatus 100 as a destination candidate of the identification information and destination information. Specifically, the transmitting terminal apparatus 100S identifies each of the terminal apparatuses 100, identified by the apparatus identification information linked to the file name or the setting information, as a terminal apparatus 100 serving as a destination of the identification information and destination information. The transmitting terminal apparatus 100S transmits the identification information and destination information to each the identified terminal apparatuses 100.

The setting information may be, for example, a parameter that the user sets when the image of the original document is read on the transmitting terminal apparatus 100S. The setting information may further be settings for a digital certificate or a password. To start reading the image on the original document, the user may possibly set a digital certificate via Public Key Infrastructure (PKI) that certifies a sender identity or may possibly set a password to code a file.

Information on setting the digital certificate and information on setting the password are linked to the apparatus group information. These pieces of information in a linked state are registered on each of the terminal apparatuses 100 and the processing apparatus 200. The one terminal apparatus group may thus be identified in accordance with the information on setting the digital certificate and the information on setting the password. Specifically, the one terminal apparatus group may be identified, for example, using information indicating whether the digital certificate has been set, information indicating the password has been set, contents of the setting of the digital certificate, and/or contents of the set password.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
   transmit pre-process information to a processing apparatus that generates post-process information as a result of processing the pre-process information;
   transmit identification information, used to acquire the post-process information, to an apparatus belonging to an apparatus group, satisfying a predetermined condition, among a plurality of apparatus groups of apparatuses that are enabled to acquire the post-process information and transfer the acquired post-process information to a specific apparatus;
   acquire user information serving as information on a user operating the information processing apparatus; and
   transmit the identification information to the apparatus belonging to the apparatus group, linked to the user information, from among the apparatus groups.

2. The information processing apparatus according to claim 1, wherein the information processing apparatus belongs to the apparatus group.

3. The information processing apparatus according to claim 1, wherein the apparatus group is specified by the user.

4. The information processing apparatus according to claim 1, wherein the processor is configured to not transmit the identification information to the apparatus when the apparatus is in a specific state.

5. The information processing apparatus according to claim 4, wherein the specific state is that the apparatus is not enabled to transmit the identification information to the specific apparatus.

6. The information processing apparatus according to claim 1, wherein the apparatus is linked to specific information included in the pre-process information.

7. The information processing apparatus according to claim 6, wherein the processor is configured to, if the pre-process information includes information representing images including a specific image, transmit the identification information to the apparatus belonging to the apparatus group linked to the specific image.

8. The information processing apparatus according to claim 1, wherein the processor is configured to:
   acquire the identification information from the processing apparatus; and
   transmit the identification information acquired from the processing apparatus to the apparatus belonging to the apparatus group satisfying the predetermined condition.

9. The information processing apparatus according to claim 1, wherein the processor is configured to transmit to the processing apparatus the identification information that is to be transmitted to the apparatus belonging to the apparatus group satisfying the predetermined condition.

10. The information processing apparatus according to claim 1, wherein the processor is configured to transmit information on the apparatus, belonging to the apparatus group, to the processing apparatus that is used to process the pre-process information from the apparatus registered as belonging to the apparatus group.

11. The information processing apparatus according to claim 1, wherein the processor is configured to, before starting transmitting the pre-process information to the processing apparatus, start transmitting the identification information to the apparatus belonging to the apparatus group satisfying the predetermined condition.

12. A non-transitory computer readable medium storing a program causing a computer to execute a process, the process comprising:
   transmitting pre-process information to a processing apparatus that generates post-process information as a result of processing the pre-process information;
   transmitting identification information, used to acquire the post-process information, to an apparatus belonging to an apparatus group, satisfying a predetermined condition, among a plurality of apparatus groups of apparatuses that are enabled to acquire the post-process information and transfer the acquired post-process information to a specific apparatus;
   acquiring user information serving as information on a user operating the computer; and
   transmitting the identification information to the apparatus belonging to the apparatus group, linked to the user information, from among the apparatus groups.

13. An information processing method for an information processing apparatus, the method comprising:
   transmitting pre-process information to a processing apparatus that generates post-process information as a result of processing the pre-process information;
   transmitting identification information, used to acquire the post-process information, to an apparatus belonging to an apparatus group, satisfying a predetermined condition, among a plurality of apparatus groups of apparatuses that are enabled to acquire the post-process information and transfer the acquired post-process information to a specific apparatus;
   acquiring user information serving as information on a user operating the information processing apparatus; and
   transmitting the identification information to the apparatus belonging to the apparatus group, linked to the user information, from among the apparatus groups.

* * * * *